United States Patent
Nogami et al.

(10) Patent No.: US 8,320,849 B2
(45) Date of Patent: Nov. 27, 2012

(54) TRANSMITTER FOR COMMUNICATIONS SYSTEM

(75) Inventors: Toshizo Nogami, Chiba (JP); Kimihiko Imamura, Vancouver, WA (US); Ryota Yamada, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/517,585

(22) Filed: Jun. 13, 2012

(65) Prior Publication Data

US 2012/0252381 A1     Oct. 4, 2012

Related U.S. Application Data

(62) Division of application No. 12/097,865, filed as application No. PCT/JP2006/325282 on Dec. 19, 2006, now Pat. No. 8,224,263.

(30) Foreign Application Priority Data

Dec. 20, 2005    (JP) .................................. 2005-366590

(51) Int. Cl.
    *H03C 7/02*            (2006.01)
    *H04K 3/00*            (2006.01)
(52) U.S. Cl. ......................... 455/101; 370/208; 375/299
(58) Field of Classification Search .................... 455/59, 455/101–103, 450; 370/208; 375/299
See application file for complete search history.

(56) References Cited

U.S. PATENT DOCUMENTS

| | | | |
|---|---|---|---|
| 4,726,038 A | 2/1988 | Ikegami et al. | |
| 5,991,331 A | 11/1999 | Chennakeshu et al. | |
| 6,034,987 A | 3/2000 | Chennakeshu et al. | |
| 6,131,016 A | 10/2000 | Greenstein et al. | |
| 6,650,910 B1 | 11/2003 | Mazur et al. | |
| 6,807,145 B1 | 10/2004 | Weerackody et al. | |
| 6,842,487 B1 | 1/2005 | Larsson | |
| 6,980,612 B1 | 12/2005 | Miyoshi | |
| 7,002,939 B1 | 2/2006 | Hiramatsu | |
| 7,277,469 B2 | 10/2007 | Brunel | |
| 7,298,797 B2 | 11/2007 | Hwang et al. | |
| 7,436,903 B2 | 10/2008 | Sandhu et al. | |
| 7,672,388 B2 | 3/2010 | Frank | |
| 7,742,533 B2 | 6/2010 | Aoki et al. | |

(Continued)

FOREIGN PATENT DOCUMENTS

CN            1320308 A      10/2001

(Continued)

OTHER PUBLICATIONS

"Enhances Frequency Diversity and Scheduling Performance in Evolved UTRA", Samsung Electronics Co. Ltd., 3GPP TSG RAN WG1 Meeting #42 R1-050888, Aug. 29-Sep. 2, 2005, pp. 1-16.

(Continued)

*Primary Examiner* — Lee Nguyen
(74) *Attorney, Agent, or Firm* — Birch, Stewart, Kolasch & Birch, LLP

(57) ABSTRACT

An rf signal transmitter for transmitting rf signals through a plurality of antennas is described, which comprises: a transmit section adapted to selectively set, with respect to an input signal, the initial phase of an output to at least one of said antennas depending on a time or frequency region used for communication and to provide delay to the output on an antenna-by-antenna basis and on the basis of a transmission timing or a transmission frequency; and a quality information receive section for receiving quality information from destination station, i.e., a wireless terminal unit, said quality information concerning the rf signal transmitted from said transmit section and received at said destination station.

9 Claims, 29 Drawing Sheets

U.S. PATENT DOCUMENTS

| | | | |
|---|---|---|---|
| 8,099,063 B2* | 1/2012 | Nogami et al. | 455/101 |
| 8,116,696 B2* | 2/2012 | Nogami et al. | 455/101 |
| 8,224,263 B2* | 7/2012 | Nogami et al. | 455/101 |
| 2002/0186785 A1 | 12/2002 | Hoshino et al. | |
| 2003/0169682 A1 | 9/2003 | Chen et al. | |
| 2004/0137948 A1 | 7/2004 | Benning et al. | |
| 2004/0235433 A1 | 11/2004 | Hugl et al. | |
| 2004/0266354 A1 | 12/2004 | Hamada et al. | |
| 2005/0048933 A1 | 3/2005 | Wu et al. | |
| 2005/0096061 A1 | 5/2005 | Ji et al. | |
| 2005/0201268 A1 | 9/2005 | Aoki et al. | |
| 2005/0220199 A1 | 10/2005 | Sadowsky et al. | |
| 2005/0254592 A1 | 11/2005 | Nagulb et al. | |
| 2005/0281240 A1 | 12/2005 | Oh et al. | |
| 2006/0013186 A1 | 1/2006 | Agrawal et al. | |
| 2006/0068698 A1 | 3/2006 | Sandhu et al. | |
| 2006/0120473 A1 | 6/2006 | Baum | |
| 2006/0221898 A1 | 10/2006 | Bossert et al. | |
| 2006/0239226 A1 | 10/2006 | Khan | |
| 2006/0274854 A1 | 12/2006 | Matsumoto et al. | |
| 2007/0008946 A1 | 1/2007 | Kim | |
| 2007/0041464 A1 | 2/2007 | Kim et al. | |
| 2007/0098097 A1 | 5/2007 | Khan et al. | |
| 2009/0081967 A1 | 3/2009 | Imamura | |
| 2009/0135940 A1 | 5/2009 | Imamura | |
| 2009/0304120 A1 | 12/2009 | Agrawal et al. | |
| 2009/0318178 A1 | 12/2009 | Nogami et al. | |
| 2010/0322349 A1 | 12/2010 | Lee et al. | |

FOREIGN PATENT DOCUMENTS

| | | |
|---|---|---|
| CN | 1338162 A | 2/2002 |
| JP | 61-261946 A | 11/1986 |
| JP | 62-152233 A | 7/1987 |
| JP | 03-201832 | 9/1991 |
| JP | 11-088030 | 3/1999 |
| JP | 2001-69050 A | 3/2001 |
| JP | 2001-168777 A | 6/2001 |
| RU | 2107989 C1 | 3/1998 |
| RU | 2 141 168 C1 | 11/1999 |
| WO | WO 95/06365 A1 | 3/1995 |
| WO | WO 01/54305 A1 | 7/2001 |
| WO | WO 02/07341 A2 | 1/2002 |
| WO | WO 02/51031 | 6/2002 |
| WO | WO 03/026335 | 3/2003 |
| WO | WO 2005/041441 A1 | 5/2005 |
| WO | WO 2005/081481 A1 | 9/2005 |
| WO | WO 2005/117321 A1 | 12/2005 |

OTHER PUBLICATIONS

"Further Details on Adaptive Cyclic Delay Diversity Scheme", Samsung, 3GPP TSG RAN WG1 Meeting #42bis R1-051046, Oct. 10-14, 2005; pp. 1-8.

"Intra-Node B Marco Diversity based on Cyclic Delay Transmissions", Institute for Infocomm Research, NTT DoCoMO, 3GPP TSG RAN WG1 #42 on LTE R1050795; Aug. 25-Sep. 2, 2005; pp. 1-5.

"Intra-Node B Marco Diversity Using Simultaneous Transmission with Soft-combining in Evolved UTRA Downlink", NTT DoCoMo, NEC, SHARP, 3GPP TSG RAN WG1 #42 on LTE R1-050700, Aug. 29-Sep. 2, 2005; pp. 1-12.

"Physical Channels and Multiplexing in Evolved UTRA Downlink", NTT DoCoMo, 3GPP TSG RAN WG1 Ad Hoc on LTE R1-050590, Jun. 20-21, 2005; pp. 1-24.

"Physical Channels and Multiplexing in Evolved UTRA Downlink", NTT, R1-050707, 3GPP TSG RAN WG1 Meeting #42 on LTE, Aug. 29, 2005, London, UK.

"Some Aspects of Single-Carrier Transmission for E-UTRA", 3GPP TSG RAN WG1 Meeting #42, Ericsson, R1-050765, Aug. 29, 2005, London, UK.

"System Performance of Adaptive Cyclic Delay Diversity (ACDD) Scheme", 3GPP TSG RAN WG1 Meeting 42bis, Samsung, R1-051047, Oct. 10-14, 2005, San Diego, USA.

Auer, G.: "Channel Estimation by Set Partitioning for OFDM With Cyclic Delay Diversity" 2004 IEEE, Sep. 26, 2004, pp. 669-673.

Bauch et al., "Orthogonal Frequency Division Multiple Access with Cyclic Delay Diversity", 2004 ITG Workshop on Smart Antennas, Mar. 18-19, 2004, pp. 17-24.

Notice of Reasons for Rejection from Japanese Patent Application No. 2009-026572, mailed Apr. 14, 2009.

Downlink Multiple Access Scheme for Evolved UTRA, NTT DoCoMo, 3GPP TSG RAN WG1 Meeting #40bis R1-050249; Apr. 4-8, 2005, pp. 1-8.

Eurasian Search Report issued on Eurasian Patent Application No. 200900380 with an English Translation.

European Search Report dated Jun. 8, 2010 for Application No. 06842886.1.

European Search Report dated Jun. 8, 2010 for Application No. 09010708.7.

Notice of Allowance dated Mar. 22, 2011 for U.S. Appl. No. 12/693,058.

Office Action dated Dec. 16, 2010 for U.S. Appl. No. 12/773,684.

Office Action dated Jan. 18, 2011 for U.S. Appl. No. 12/692,986.

Office Action dated Jan. 21, 2011 for U.S. Appl. No. 12/547,238.

Office Action dated Mar. 23, 2011 for U.S. Appl. No. 12/547,238.

Office Action dated Sep. 20, 2010 for U.S. Appl. No. 12/547,238.

U.S. Notice of Allowance issued in U.S. Appl. No. 12/097,865 on Mar. 8, 2012.

U.S. Notice of Allowance issued in U.S. Appl. No. 12/326,557 on Sep. 22, 2011.

U.S. Notice of Allowance issued in U.S. Appl. No. 12/326,581 on Jun. 20, 2011.

U.S. Notice of Allowance issued in U.S. Appl. No. 12/547,238 on Sep. 21, 2011.

U.S. Notice of Allowance issued in U.S. Appl. No. 12/693,058 on Jul. 13, 2011.

U.S. Notice of Allowance issued in U.S. Appl. No. 12/773,684 on Aug. 2, 2011.

U.S. Notice of Allowance issued in U.S. Appl. No. 12/773,684 on Sep. 14, 2011.

U.S. Office Action issued in U.S. Appl. No. 12/326,557 on Mar. 9, 2011.

U.S. Office Action issued in U.S. Appl. No. 12/097,865 on Jul. 6, 2011.

U.S. Office Action issued in U.S. Appl. No. 12/326,568 on Jul. 13, 2011.

U.S. Office Action issued in U.S. Appl. No. 12/326,581on Mar. 9, 2011.

U.S. Office Action issued in U.S. Appl. No. 12/547,238 on Jul. 21, 2011.

U.S. Office Action, dated May 16, 2011, for U.S. Appl. No. 12/692,986.

Eurasian Search Report issued in Eurasian Patent Application No. 200802301 on Oct. 31, 2005 with English Translation.

Eurasian Search Report issued in Eurasian Patent Application No. 200802302 on Oct. 31, 2005 with English Translation.

Eurasian Search Report issued in Eurasian Patent Application No. 200802303 on Oct. 31, 2005 with English Translation.

European Search Report issued in European Patent Application No. 06822565.5 on Feb. 4, 2010.

European Search Report issued in European Patent Application No. 08021641.9 on Feb. 4, 2010.

European Search Report issued in European Patent Application No. 08021643.5 on Feb. 2, 2010.

U.S. Notice of Allowance issued in U.S. Appl. No. 12/693,058 on Oct. 6, 2010.

* cited by examiner

PHASE p1

PRIORITY ↓

| f1 | f3 |
|---|---|
| TERMINAL UNITS 12 (10) | TERMINAL UNITS 14 (9.5) |
| TERMINAL UNITS 14 (6.5) | TERMINAL UNITS 12 (8.5) |
| TERMINAL UNITS 13 (1) | TERMINAL UNITS 13 (1.5) |

PHASE p2

PRIORITY ↓

| f1 | f3 |
|---|---|
| TERMINAL UNITS 13 (5) | TERMINAL UNITS 13 (6) |
| TERMINAL UNITS 14 (4) | TERMINAL UNITS 12 (3) |
| TERMINAL UNITS 12 (3.5) | TERMINAL UNITS 14 (2.5) |

*FIG. 29*

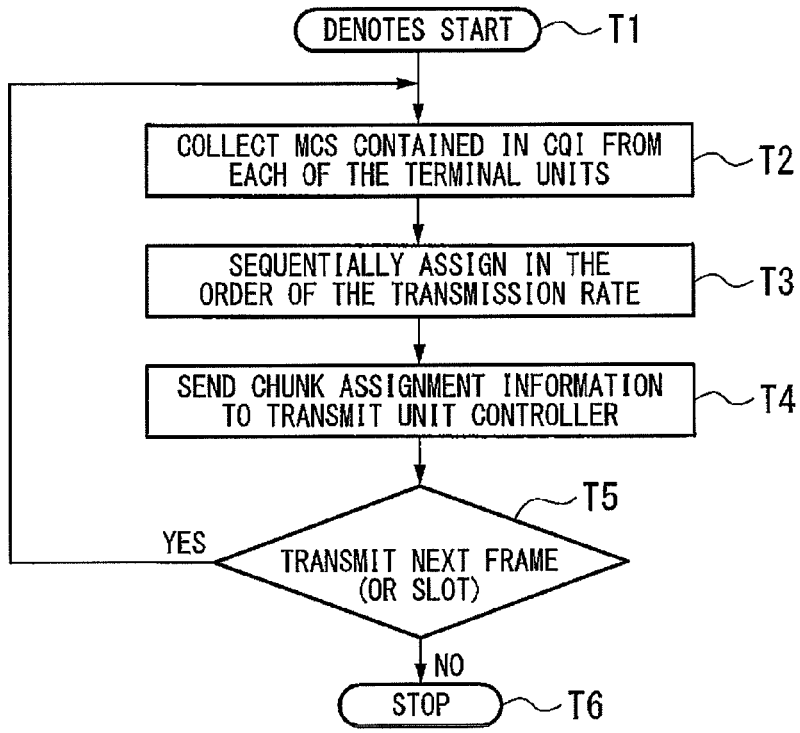

- DENOTES START — T1
- COLLECT MCS CONTAINED IN CQI FROM EACH OF THE TERMINAL UNITS — T2
- SEQUENTIALLY ASSIGN IN THE ORDER OF THE TRANSMISSION RATE — T3
- SEND CHUNK ASSIGNMENT INFORMATION TO TRANSMIT UNIT CONTROLLER — T4
- TRANSMIT NEXT FRAME (OR SLOT) — T5
- STOP — T6

*FIG. 30*

| MCS | MODULATION TYPE | CODING RATE | TRANSMISSION RATE |
|---|---|---|---|
| 1 | QPSK | 1/8 | 1.942Mbps |
| 2 | QPSK | 1/4 | 3.884Mbps |
| 3 | QPSK | 1/2 | 7.782Mbps |
| 4 | QPSK | 2/3 | 10.376Mbps |
| 5 | 16QAM | 1/2 | 15.582Mbps |
| 6 | 16QAM | 2/3 | 20.776Mbps |
| 7 | 64QAM | 1/2 | 23.382Mbps |
| 8 | 64QAM | 3/5 | 28.058Mbps |
| 9 | 64QAM | 2/3 | 31.176Mbps |
| 10 | 64QAM | 3/4 | 35.072Mbps |

TRANSMITTER FOR COMMUNICATIONS SYSTEM

This application is a Divisional of application Ser. No. 12/097,865, filed on Jun. 17, 2008, now U.S. Pat. No. 8,224,263, for which priority is claimed under 35 U.S.C. §120. U.S. patent application Ser. No. 12/097,865 is the national phase of PCT International Application No. PCT/JP2006/325282 filed on Dec. 19, 2006 under 35 U.S.C. §371, which claims priority on Japanese Patent Application No. 2005-366590 filed Dec. 20, 2005, the contents of which are incorporated herein by reference.

TECHNICAL FIELD

The present invention relates to a radio frequency (rf) signal transmitter and, particularly to a transmitter for transmitting rf signals through a plurality of antennas.

BACKGROUND ART

In recent years, it has been proposed in multiple carrier transmission-related technology to divide, for user scheduling, the time-frequency plane into a plurality of blocks of regions arranged along the frequency and time axes. It is noted in this connection that the region defined by the frequency and time axes and secured for an individual user's communication is referred to as an assigned slot, and that a basic block of such regions for designating the assigned slots is referred to as a chunk.

In the transmission of broadcast/multicast signals and/or control signals, blocks distributed in a broad frequency region are assigned to achieve frequency diversity effect and Conversely, in the transmission of unicast signals for one rf transmitter-to-one rf receiver communication, it has been proposed that blocks distributed in a narrower frequency region be assigned to achieve a multiuser diversity effect (Non-Patent Documents 1, 2 and 3 referred to).

[Non-Patent Document 1]: "Downlink Multiple Access Scheme for Evolved UTRA," Apr. 4, 2005, R1-050249, 3GPP (URL: ftp://ftp.3gpp.org/TDG_RAN/WG1_RL1/TSGR1_40bis/Docs/R1-050249.zip)

[Non-Patent Document 2]: "Physical Channel and Multiplexing in Evolved UTRA Downlink," Jun. 20, 2005, R1-050590, 3GPP (URL: ftp://ftp.3gpp.org/TSG_RAN/WG1_RL1/R1_Ad_Hocs/LTE_AH_JUNE-05/Docs/R1-050590.zip)

[Non-Patent Document 3]: "Intra-Node B Macro Diversity Using Simultaneous Transmission with Soft-combining in Evolved UTRA Downlink," Aug. 29, 2005, R1-050700, 3GPP (URL: ftp://ftp.3gpp.org/tsg_ran/WG1_RL1/TSGR1_42/Docs/R1-050700.zip)

FIGS. 33 and 34 show the distribution in time (vertical axis)-frequency (horizontal axis) plane of signals to be transmitted from an rf transmitter to an rf receiver. Referring to FIG. 33, time and frequency are shown along the vertical and horizontal axes, respectively. Uniform transmission time width t1 to t5 are defined along the vertical axis. Also, transmission frequency bands f1 to f4 are defined along the horizontal axis, with a uniform bandwidth Fc. As shown in FIG. 33, time widths t1 to t5 and frequency bands f1 to f4 define twenty (20) chunks K1 to K20.

Referring to FIG. 34, four chunks K1 to K4 arranged along the frequency axis are combined into one frequency-broadened chunk of frequency bandwidth 4/1, which is then divided into three slots S1 to S3 of a uniform length of t1/3. Slots S1 to S3 are then assigned to a first to a third users, respectively, with the users enjoying the benefit of frequency diversity.

Then, chunk K5 is used as assigned slot S4 for a fourth user. Similarly, chunks K6 and K7 are combined to form an assigned slot S5 for a fifth user, while chunk K8 is used as an assigned slot S6 for a sixth user. Thus, the fourth to the sixth users enjoy the benefit of the multiuser diversity effect.

Similarly, chunks K9 and K11 are used as assigned slot S7 for a seventh user.

On the other hand, chunks K10 and K12 are divided along the time axis into three portions of equal length t3/3 of a frequency bandwidth of 2/2 to form slots S8 to S10, which are assigned to an eighth to a tenth users, respectively. Thus, the seventh to tenth users enjoy the benefit of frequency diversity effect.

Similarly, chunks K13 and K14 are used as assigned slots S11 and S12 for an eleventh and a twelfth users, respectively. On the other hand, chunks K15 and K16 are combined into a broader-band assigned slot S13 for a thirteenth user. Thus, the eleventh to thirteenth users enjoy the benefit of multiuser diversity effect.

Moreover, chunks K17 and K19 are combined into an assigned slot S14 for a fourteenth user. On the other hand, chunks K18 and K20 are combined into slots S15 to S17 of a frequency bandwidth of 2/2 and a time length of t5/3. Slots S15 to S17 are assigned to a fifteenth to a seventeenth users, respectively. Thus, the fourteenth to seventeenth users are benefited by a frequency diversity effect.

The problem associated with the conventional technology described above is that the multiuser diversity effect is not adequately achieved depending on the location of the mobile terminal unit user and the associated slot assigned thereto.

DISCLOSURE OF INVENTION

According to the present invention, there is provided an rf signal transmitter for transmitting such signals through a plurality of antennas, comprising: a transmit section adapted to selectively set, with respect to an input signal, the initial phase of an output to at least one of said antennas depending on time or frequency region used for communication and to provide delay to the output on an antenna-by-antenna basis and on the basis of transmission timing or transmission frequency; and a quality information receive section for receiving such quality information from a destination station concerning the rf signal transmitted from said transmit section.

According to one aspect of the invention, there is provided an rf signal transmitter of the type described above, wherein said transmit section provides said initial phase and said delay to each of the chunks formed by dividing each of the rf signal frames of a predetermined length of time extending over the entire frequency band assigned for communication.

According to another aspect of the invention, there is provided an rf signal transmitter further comprising a scheduling section adapted to assign each of said terminal units to a specific chunk, based on the scheduling of said initial phase and said delay provided by said transmit section.

According to still another aspect of the invention, there is provided an rf signal transmitter, wherein said transmit section is adapted to change the amount of said delay, to thereby give an optimum diversity effect to each of said chunks.

According to still another aspect of the invention, there is provided an rf signal transmitter, wherein the selective setting of said delay at said transmit section is performed by selecting one out of a plurality of delay amounts provided in advance in said transmit section.

According to still another aspect of the invention, there is provided an rf signal transmitter, wherein said diversity effect is either a frequency diversity effect or a multiuser diversity effect, and wherein the amount of said delay given to said chunk for achieving the frequency diversity effect is greater than that given to said chunk for achieving the multiuser diversity effect.

According to still another aspect of the invention, there is provided an rf signal transmitter, wherein said chunk belongs to a region where either the frequency diversity effect or the multiuser diversity effect is achieved, and wherein said transmit section is adapted to set said initial phase at a value common to all the chunks belonging to the region where the frequency diversity effect is achieved.

According to still another aspect of the invention, there is provided an rf signal transmitter, wherein said chunk includes a pilot signal for assessing receive signal quality and a common data signal for transmitting data, and wherein the amount of said initial phase and said delay in one of said chunks is the same for both said pilot signal and said common data signal contained in said chunk.

According to still another aspect of the invention, there is provided an rf signal transmitter, wherein said scheduling section includes: means for deciding on the priority of a plurality of said terminal units through comparison of information concerning said receive signal quality received from each of said terminal units; and means for assigning a specific chunk to each of said terminal units on the basis of said priority.

According to still another aspect of the invention, there is provided an rf signal transmitter, wherein the initial phase of a chunk being processed at said priority deciding means is equal to that of a chunk being processed at said assigning means.

According to still another aspect of the invention, there is provided an rf signal transmitter, wherein the amount of delay set for said chunk being processed at said priority deciding means is equal to that of a chunk being processed at said assigning means.

According to still another aspect of the invention, there is provided an rf signal transmitter, wherein said scheduling section performs, on a frame-by-frame basis, the operation of assigning said terminal unit to a specific chunk in a frame, and wherein the amount of said initial phase or said delay set by said transmit section for a chunk lying at the same position in said frame is common to all said frames.

According to still another aspect of the invention, there is provided an rf signal transmitter, wherein said transmit section sets the amount of said initial phase or said delay at the same value at a predetermined repetition period.

According to still another aspect of the invention, there is provided an rf signal transmitter, wherein said scheduling section is adapted to assign to a terminal unit a communication time region defined by the lapse of the prefixed round trip time after receipt from the terminal unit of information concerning the quality of the receive signal, and wherein said repetition period is said round trip time multiplied by the reciprocal of a natural number.

According to still another aspect of the invention, there is provided an rf signal transmitter, wherein said transmit section is adapted to give as said delay a phase rotation of $2\pi f_m \cdot nT$ (T stands for a prefixed time) to said signal to be transmitted through the n-th one of said antennas by a subcarrier of a frequency differing from the 0-th subcarrier by $f_m$.

According to still another aspect of the invention, there is provided an rf signal transmitter, wherein said transmit section decides the amount of said initial phase to be given to each of said chunks, on the basis of said information concerning receive signal quality.

According to still another aspect of the invention, there is provided an rf signal transmitter, wherein the number of chunks to which the same amount of the initial phase is given, is decided on the basis of said information concerning receive signal quality.

According to still another aspect of the invention, there is provided an rf signal transmitter, wherein the selective setting of said initial phase at said transmit section is performed by selecting one out of a plurality of initial phase values provided in advance in said transmit section.

According to still another aspect of the invention, there is provided an rf signal transmitter, wherein said transmit section is adapted to give as said initial phase a phase rotation of $\Phi_n$ to a signal to be transmitted through the n-th one of said antennas, and wherein the difference, in the same timing and in the same frequency, between said $\Phi_n$ and another phase rotation $\Phi_0$ given to the 0th antenna as initial phase is equal to one out of K mutually different values (K: natural number), where the K different values are given by $2\pi k/K$ ($k=0, 1, 2, \ldots, K-1$).

The rf signal transmitter of the present invention, wherein the transmit section is adapted to give the input signal the initial phase, which selectively sets the amount of delay given to the output to at least one of the antennas, has the advantage of permitting the multiuser diversity effect to be achieved even in time domain, resulting in excellent multiuser diversity effect.

BRIEF DESCRIPTION OF THE DRAWINGS

FIG. 29 shows a flowchart for describing the operation of a scheduler unit 19 in the fourth embodiment.

FIG. 30 shows an example of MSC information in the embodiment.

REFERENCE SYMBOLS 1 denotes rf signal transmitter;
2, 3 and 4, transmission antennas;
5 and 6, delay means;
7, rf signal receiver;
8, rf signal transmitter;
9 and 10, rf signal receiver;
11, base station;
12, 13 and 14, wireless terminal units;
15, packet data convergence protocol (PDCP) unit;
16, radio link control (RLC) unit;
17, media access control (MAC) unit;
18, physical layer;
19, scheduler;
20, transmit unit controller;
21, transmit unit;
22, receive unit;
23, radio frequency conversion unit;
24, 25 and 26, antennas;
110x and 110y, user-by-user signal processors;
111, error correction coding unit;
112, modulation unit;
120, pilot signal generator;
130, subcarrier assignment unit;
140a, 140b and 140c, antenna-by-antenna signal processors;
141, phase rotation unit;
142, inverse fast Fourier transform (IFFT) unit;
143, parallel-to-serial converter;
144, guard interval insertion unit;
145, filter;
146, D-A converter;
210x and 210y, user-by-user signal processors;
211, error correction coding unit;
212, modulation unit;
213, subcarrier assignment unit;
214, IFFT unit;
215, parallel-to-serial converter;
216, circulating delay insertion unit;
230a, 230b and 230c, antenna-by-antenna signal processors;
231, signal combining unit;
232, guard interval insertion unit;
233, filter; and
234, D-A converter.

BEST MODE FOR CARRYING OUT THE INVENTION

Figure 1:
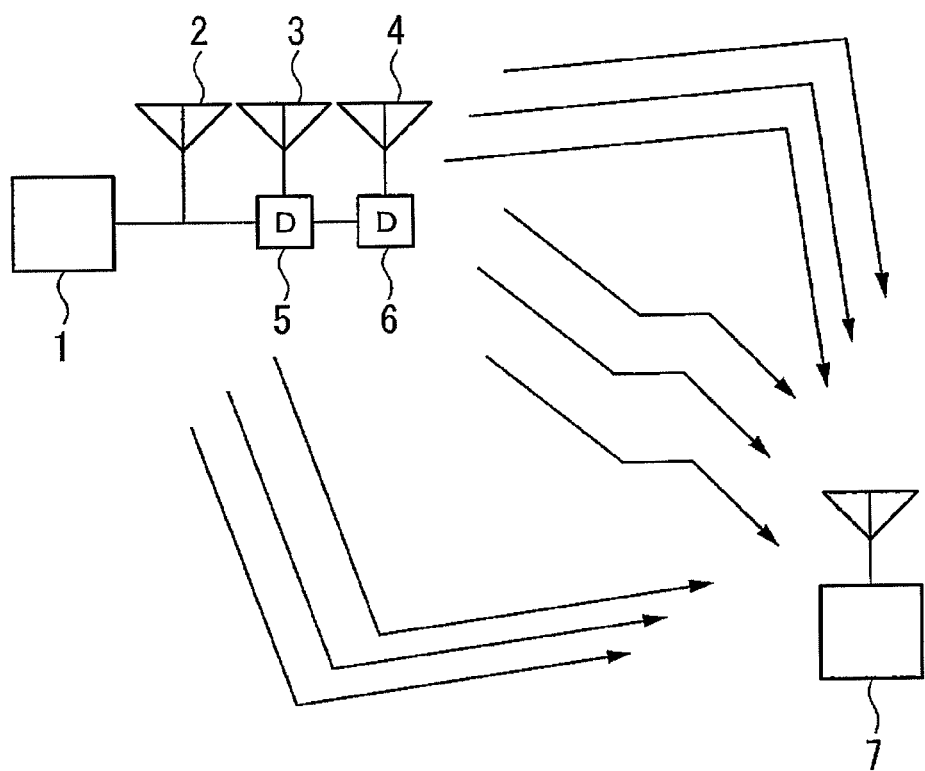
FIG. 1 shows in blocks an rf communication system, which employs an rf signal transmitter 1 according to a first embodiment of the present invention.

A first embodiment of the present invention will now be described referring to the drawings. In FIG. 1, which schematically shows the signal transmitted from a rf signal transmitter 1 to an rf signal receiver 7 through a plurality of transmission paths, the transmitter 1 has antennas 2, 3 and 4, to which the transmit signal is supplied directly, through a delay means 5 of a delay T and additionally, through a delay means 6 of a delay T, respectively, so that antennas 2, 3 and 4 may transmit the same rf signal with a delay of 0, T and 2T, respectively. The rf signal receiver 7 receives the rf signal transmitted from the transmitter 1. While the transmitter 1 has three antennas 2 to 4, these antennas may be those located in the same sector, or in mutually different sectors within the coverage of the same base station, or in mutually different coverages of base stations, assuming that the transmitter 1 constitutes a base station unit for a mobile telephone system. It is assumed in this specification that three antennas are located in the same sector. It is also assumed as described above that each of the delay means 5 and 6 provides a delay time T, thereby to give a delay T to the rf signal transmitted from the antenna 3, while giving a delay 2T to the rf signal transmitted from antenna 4.

Figure 2A:
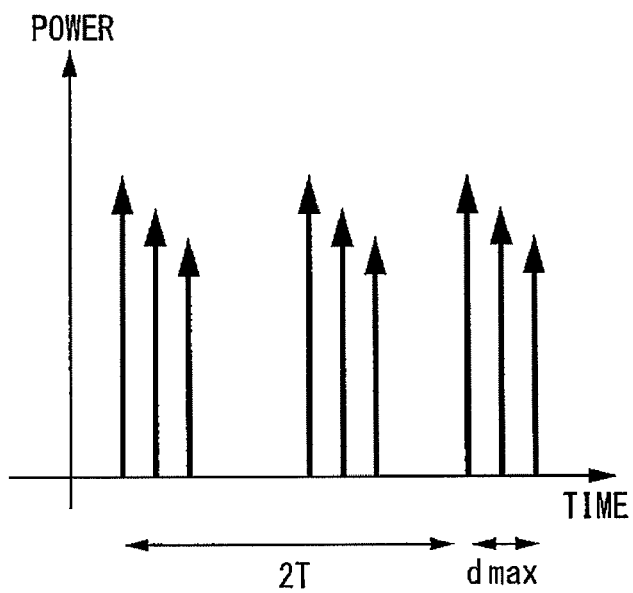
FIG. 2A schematically shows signal delay profile used in the above embodiment.
Figure 2B:
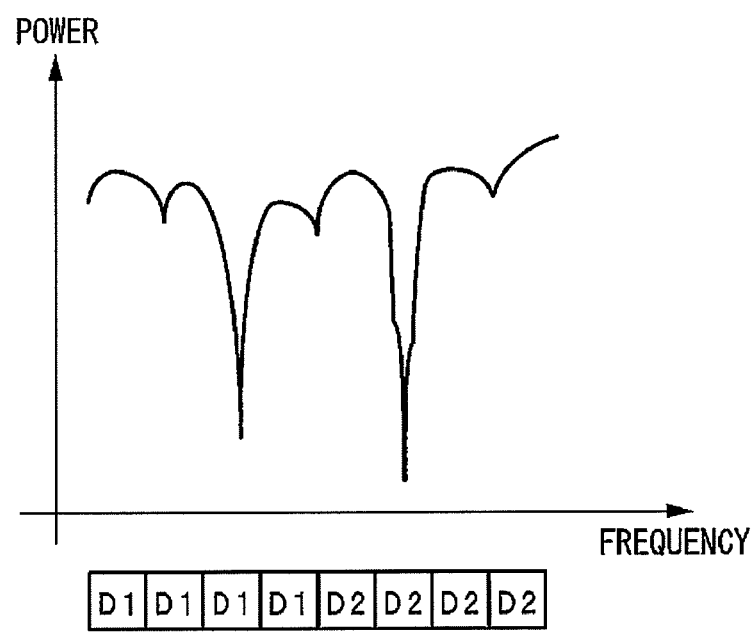
FIG. 2B schematically shows a transfer function associated with the above embodiment.

FIGS. 2A and 2B show, respectively, a signal delay profile and transfer function for a plurality (3 in number) of the rf signals transmitted through mutually different transmission paths, which involve the three delay times of 0, T and 2T mentioned above. FIG. 2A shows, with respect to the lapse of time (horizontal axis), the magnitude of signal power (vertical axis) of the three rf signal components transmitted to reach the rf receiver through the three transmission paths involving the three delay times mentioned above. More specifically, received signal power has a maximum delayed component at 2T+dmax, which is significantly larger than the corresponding component of received signal power when the same rf signal is transmitted at the same timing. It should be noted here that dmax stands for the difference in reception timing between the rf signals, which have been transmitted through the longest and shortest transmission paths, respectively.

Referring to FIG. 2B, which shows a transfer function in terms of the receive signal power based on the Fourier transform of the delay profile in the time domain as shown in FIG. 2A, the large delayed component observed at 2T+dmax in the delay profile means a steep variation in the transfer function in frequency domain. Therefore, data D1 and D2 are spread with a spreading ratio of 4 as shown in FIG. 2B, to which a subcarrier is assigned. While it is desirable in this connection to control, on the transmitter 1 side, the spreading ratio or the coding rate for the error-correction code depending on the variation in the transfer function. The spreading ratio or the coding rate for the error-correction code can be determined independently of the frequency-dependent variation of the characteristics of the transmission path because the delay 2T is known on the transmitter 1 side.

Figure 3A:
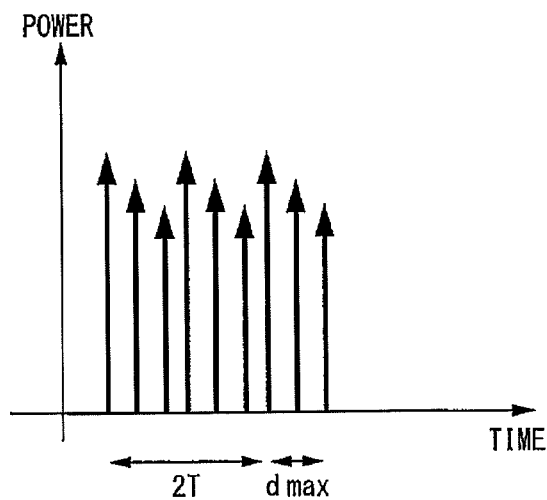
FIG. 3A schematically shows signal delay profile used in the above embodiment.
Figure 3B:
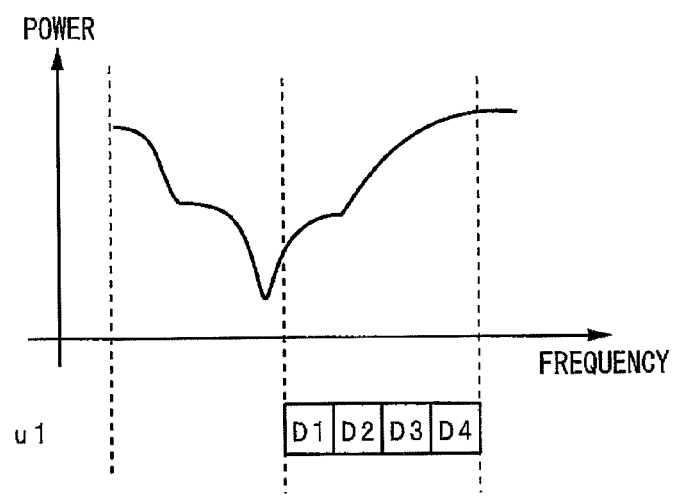
FIG. 3B schematically shows another transfer function associated with the above embodiment.
Figure 3C:
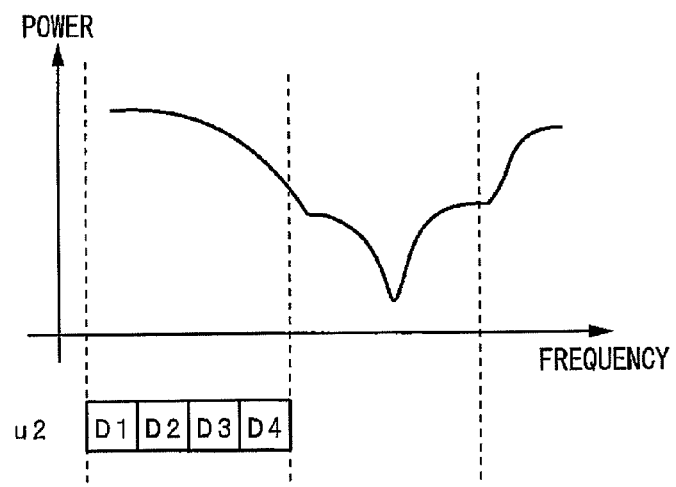
FIG. 3C shows still another transfer function associated with the above embodiment.

If a multiuser diversity effect is to be achieved, the maximum delay 2T+dmax for instantaneous delay profile should not preferably be very large. FIGS. 3A to 3C show a delay profile and transfer functions for the receive signals transmitted through paths involving mutually different delay times. More particularly, FIG. 3A shows, with respect to the lapse of time (horizontal axis), the magnitude of signal power (vertical axis) of the three rf signal components transmitted through three transmission paths involving mutually different delay time. On the other hand, FIGS. 3B and 3C show transfer functions observed at the rf signal receivers of users u1 and u2, respectively. Due to the difference in location of the users u1 and u2, the transfer function for any moment observed at the receiver of one of them differs from that observed at the receiver of the other. More definitely, assuming that the left-hand and right-hand regions of the curves shown in FIGS. 3B and 3C are for frequency channels b1 and b2, respectively, the receiver of user u1 enjoys the benefit of the better transmission quality of frequency channel b2, while the receiver of user u2 enjoys a better quality reception at frequency channel b1. Thus, the transmission of data D1-D4 to user u1 is performed through frequency channel b2, while the transmission of data D1-D4 to user b2 is performed through frequency channel b1.

As described above, multiuser diversity effect, which can enhance transmission efficiency of a wireless communication system, is achieved by allowing mutually different users to use mutually different frequency channels, thereby to utilize a frequency channel of better transmission quality for any given moment. However, when the maximum delay time 2T+dmax is set at a value which is excessively large, the transfer function comes to suffer steeper variation in terms of frequency, with the result that the difference in transmission quality between frequency channels b1 and b2 becomes smaller. To achieve adequate multiuser diversity effect, the maximum delay time 2T+dmax should be set at a value which is sufficiently small.

Figure 4A:
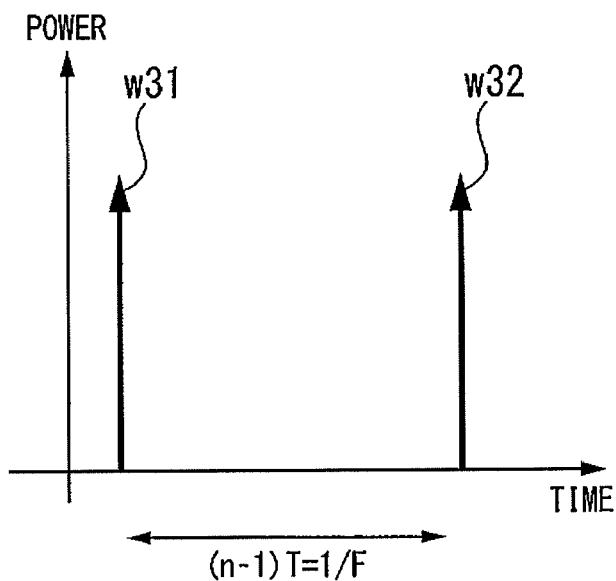
FIG. 4A schematically shows the maximum signal delay associated with the embodiment.
Figure 4B:
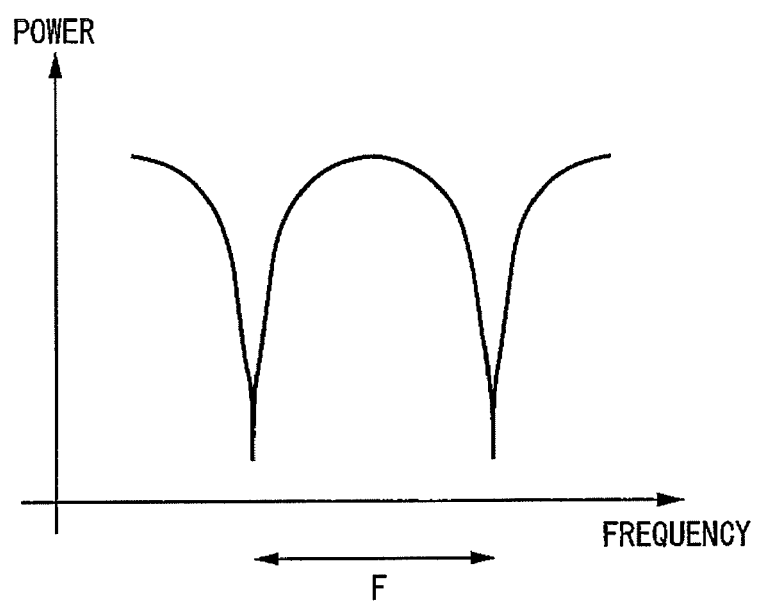
FIG. 4B shows the relationship of the maximum delay amounts shown in FIG. 4A to frequency change.
Figure 5A:
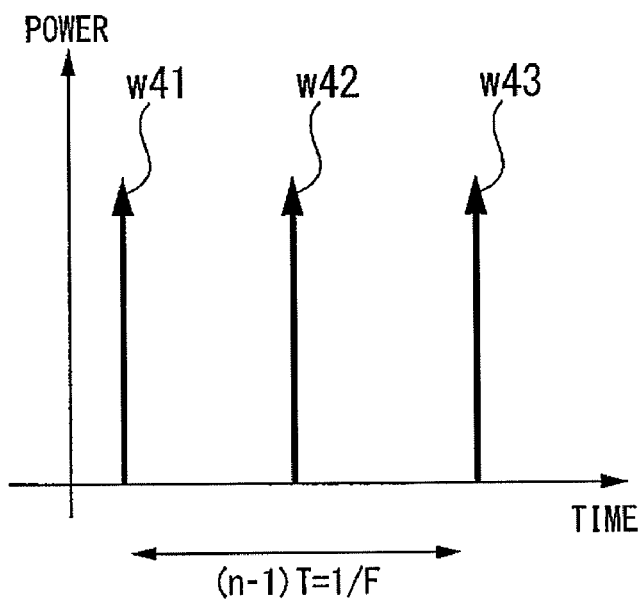
FIG. 5A shows maximum delay amounts associated with the embodiment.
Figure 5B:
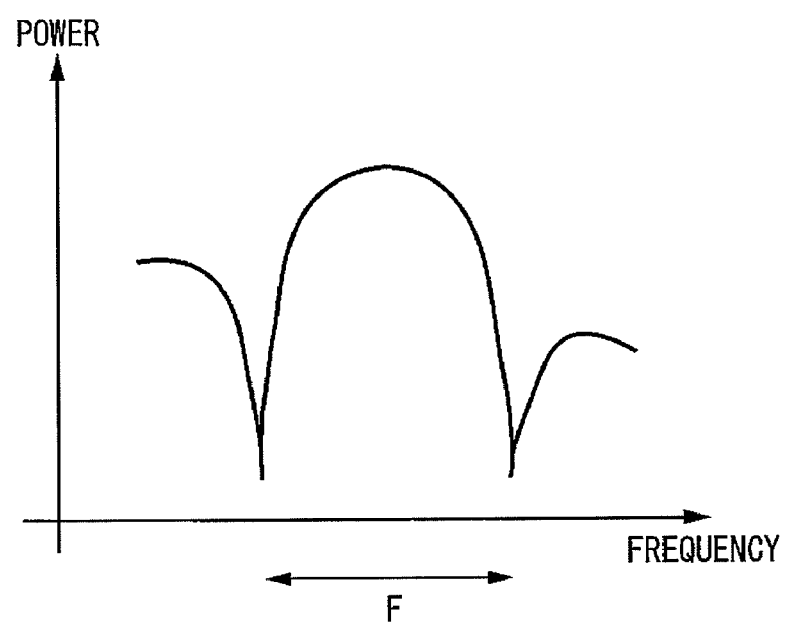
FIG. 5B shows the relationship of the maximum delay amounts shown in FIG. 5A to frequency change.

FIGS. 4A, 4B, 5A and 5B show the relationship between the maximum delay time $(n-1)T$ shown in the time domain and the variation in transfer function shown in the frequency domain. When the transmitted rf signal is received at the receiver with power w31 and w32 with a delay $(n-1)T$, the transfer function of the transmission path from the transmitter to the receiver is as shown in FIG. 4B, with the frequency spacing of the steep drop in the receive power (vertical axis) defined by $F=1/(n-1)T$. Similarly, when the transmitted rf signal is received, as shown in FIG. 5A, at the receiver with a power of w41, w42 and w43, with the last signal power w43 received $(n-1)T$ later than the first signal power w41, the frequency spacing of the steep drop in the receive power (vertical axis) is defined also by $F=1/(n-1)T$.

As described above, when frequency diversity effect is to be achieved, the transfer function should exhibit variation at a frequency different from that for the case where the multiuser diversity effect is to be achieved. Therefore, when the frequency diversity effect is pursued, an environment suited for the achievement of such effect is realized by setting $(n-1)T>Fc$, where the maximum delay time $(n-1)T$ is set by the transmit antenna-to-transmit antenna spacing, and the frequency bandwidth Fc is assumed for the chunk which is the basic region defined by the time-frequency plane for securing the user-to-user communication. In contrast, when the multiuser diversity effect is pursued, an environment suited for the achievement of such effect is realized by setting $(n-1)T<1/Fc$, where the maximum delay time $(n-1)T$ is set by the transmit antenna-to-transmit antenna spacing. In the description given below, when $(n-1)T<1/Fc$ is set, it includes $(n-1)T=0$. While it is assumed in the description below that the delay time introduced by the use of the plurality of transit antennas is given by T multiplied by $(n-1)$ with T assumed to be constant, the antennas may have mutually different values for T. Also, when the multiuser diversity effect is pursued, the number of transmit antennas may be reduced, instead of setting $(n-1)T<1/Fc$, thereby to shorten the maximum delay time.

As described above, the frequency diversity effect or the multiuser diversity effect can be achieved without being affected by the conditions of the transmission paths, by setting $(n-1)T>1/Fc$ or $(n-1)T<1/Fc$, depending on whether the rf signal is transmitted based on frequency diversity or multiuser diversity.

The transmission on the basis of frequency diversity or multiuser diversity can be chosen, depending on the type of signals to be transmitted (e.g., pilot signal, control signal, broadcast/multicast signal, etc.), or the rate of change in location of the transmitter (frequency diversity for fast-moving transmitter and multiuser diversity for slow-moving transmitter, etc.).

Figure 6A:
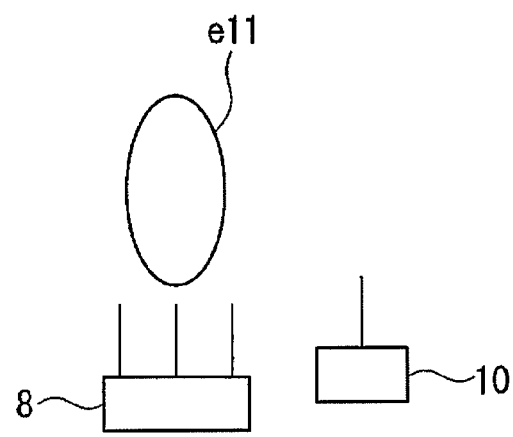
FIG. 6A illustrates the transmission in the above embodiment of a common rf signal through a plurality of antennas without any delay applied to the signal.
Figure 6B:
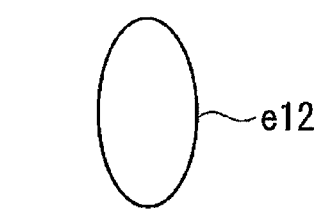
FIG. 6B shows the frequency distribution of receive signal power at rf receiver 9 shown in FIG. 6A.
Figure 6C:
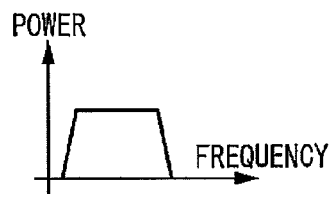
FIG. 6C shows the frequency distribution of receive signal power at an rf receiver 10.

FIGS. 6A-6C illustrate the operation of the system, wherein an rf signal transmitter 8 transmits the same rf signal simultaneously from a plurality of antennas without giving any delay therebetween. Assuming that an rf signal transmitter 8 is used with a plurality (3 in number) of horizontally non-directional antennas arranged in parallel with each other as shown in FIG. 6A, elliptical lobes e11 and e12 are formed in a radiation pattern as shown in FIG. 6A. As a result, there will be a region where the rf signals will be received by a receiver 9, for example, at a relatively high receive signal power level throughout the entire frequency band (see FIG. 6B), while there will be another region where the rf signals are received at a relatively low receive signal power level throughout the entire frequency band (see FIG. 6C).

Figure 7A:
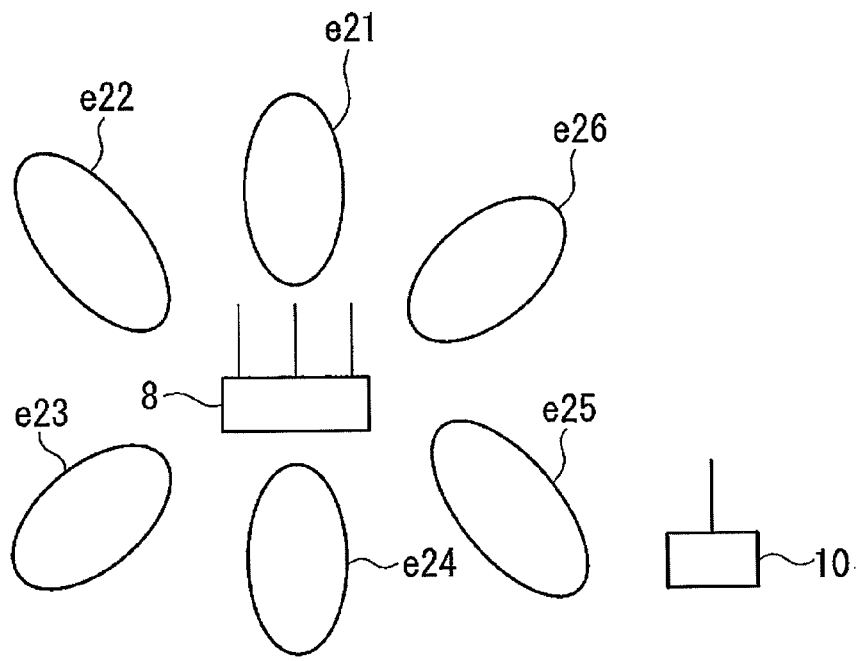
FIG. 7A illustrates the transmission in the above embodiment of a common rf signal from a plurality of antennas with mutually different delay amounts introduced at respective antennas.
Figure 7B:
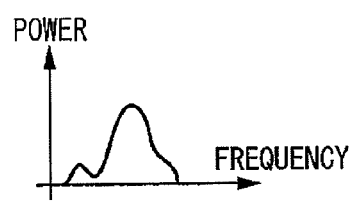
FIG. 7B shows the frequency distribution of receive signal power at an rf receiver 9 shown in FIG. 7A.
Figure 7C:
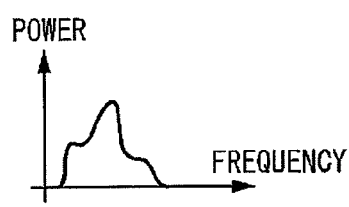
FIG. 7C shows the frequency distribution of receive signal power at an rf receiver 10 shown in FIG. 7A.

FIGS. 7A-7C illustrate the operation of the system, where rf signal transmitter 8 transmits the same rf signal giving mutually different delay time to the respective signals. Assuming that the rf signal transmitter 8 is used with a plurality (3 in number) of horizontally non-directional antennas arranged in parallel with each other as shown in FIG. 7A, the average receive signal level at the rf signal receiver 9 is kept substantially constant (see FIG. 7B) regardless of the direction, although there will be the rf receive signal frequency regions where the receive signal power level is high or low, due to the elliptical lobes e21-e26 of the radiation pattern as shown in FIG. 6A, with the result that the transmission quality at the receive signal level of the rf receiver 9 (FIG. 7B) and that of an rf receiver 10 (FIG. 7C) can be made comparable to each other. Thus, the transmission of rf signals from the rf transmitter 8 with a mutually different delay time given to the signals at transmission antennas can dissolve the defect involved in the system shown FIGS. 6A and 6B where the same rf signals are transmitted simultaneously through a plurality of transmission antennas without any delay as shown in FIGS. 6A to 6C.

Figure 8:
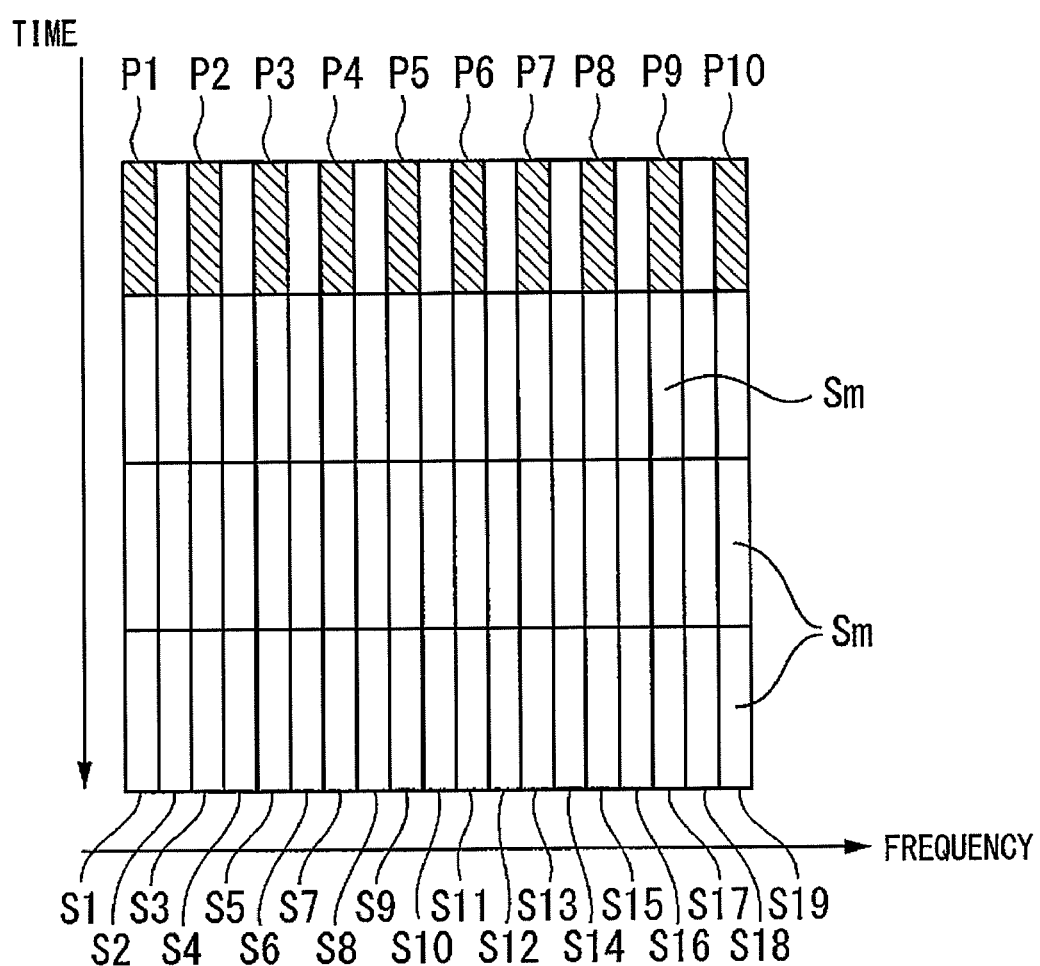
FIG. 8 shows how the chunk in the embodiment is structured.

FIG. 8 shows how the signals are arranged in chunk K1 shown in FIG. 1. Referring to FIG. 8, chunk K1 includes nineteen (19) subcarriers S1 to S19 arranged along the horizontal (frequency) axis, and four (4) orthogonal frequency division multiplexed (OFDM) symbols sm arranged along the vertical (frequency) axis. Hatched portions P1 to P10 denote common pilot channels for transmitting the Common Pilot Channel (CPICH) signals, which are for estimating the condition of the transmission paths at the time of demodulation and for determining the quality of the received rf signal. Those portions of the chunk other than the above-mentioned hatched portions are common data channels for transmitting common data signals. It should be noted here that chunks K1 to K20 are of the same signal structure.

Figure 9:
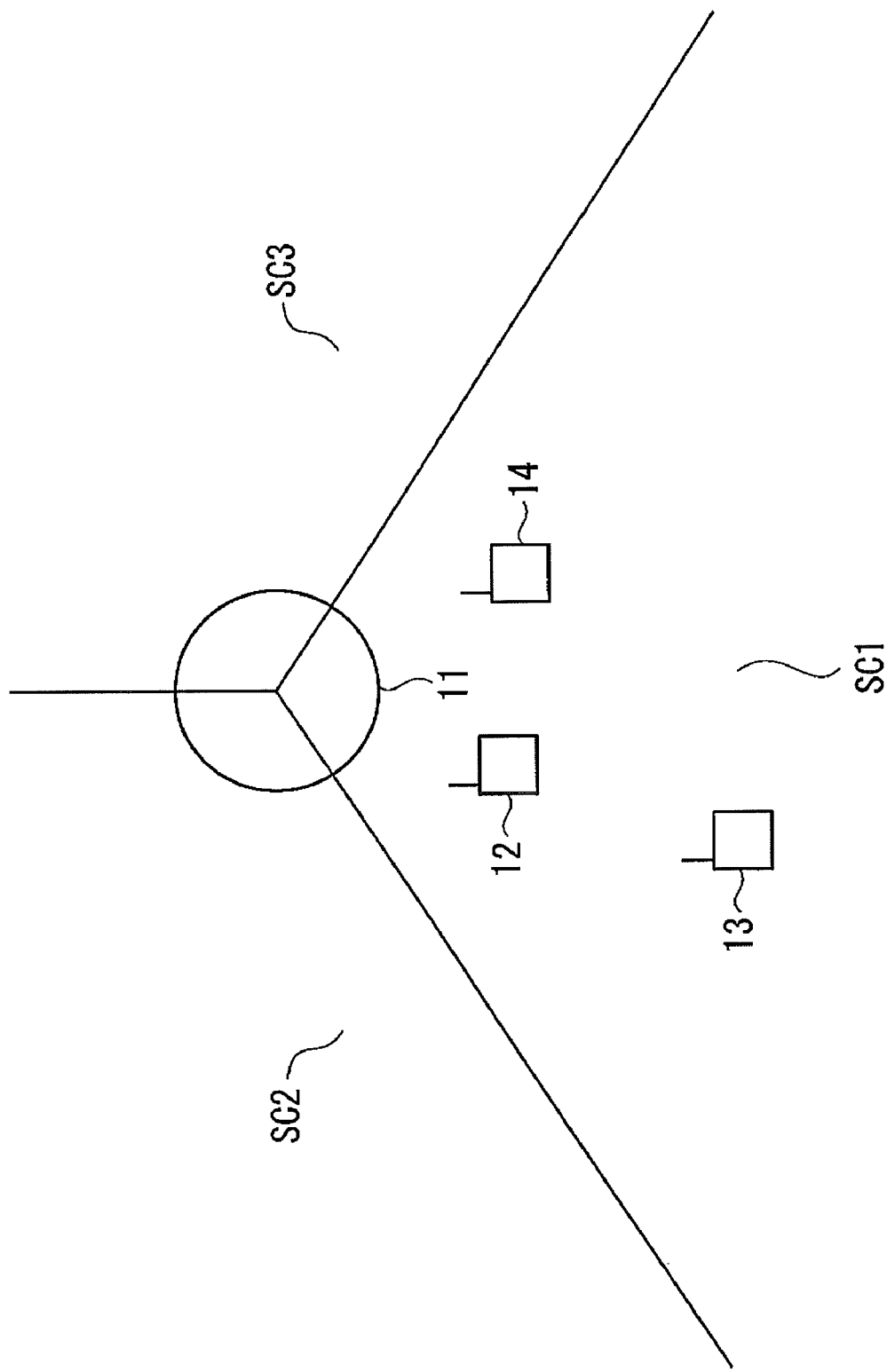
FIG. 9 illustrates the state where a plurality of (three in number) wireless mobile terminal units are in communication with a base station.

Referring now to FIG. 9, mobile terminal units 12, 13 and 14 located in the area surrounding a base station unit 11, which includes an rf signal transmitter embodying the present invention, are in communication with the base station unit 11. The base station unit 11 defines three sectors SC1-SC3, each of which has a plurality of (e.g., three) antennas. It will be recognized here that the three mobile units mentioned above are in communication with sector SC1 in the manner described above in conjunction with FIG. 1.

Figure 10:
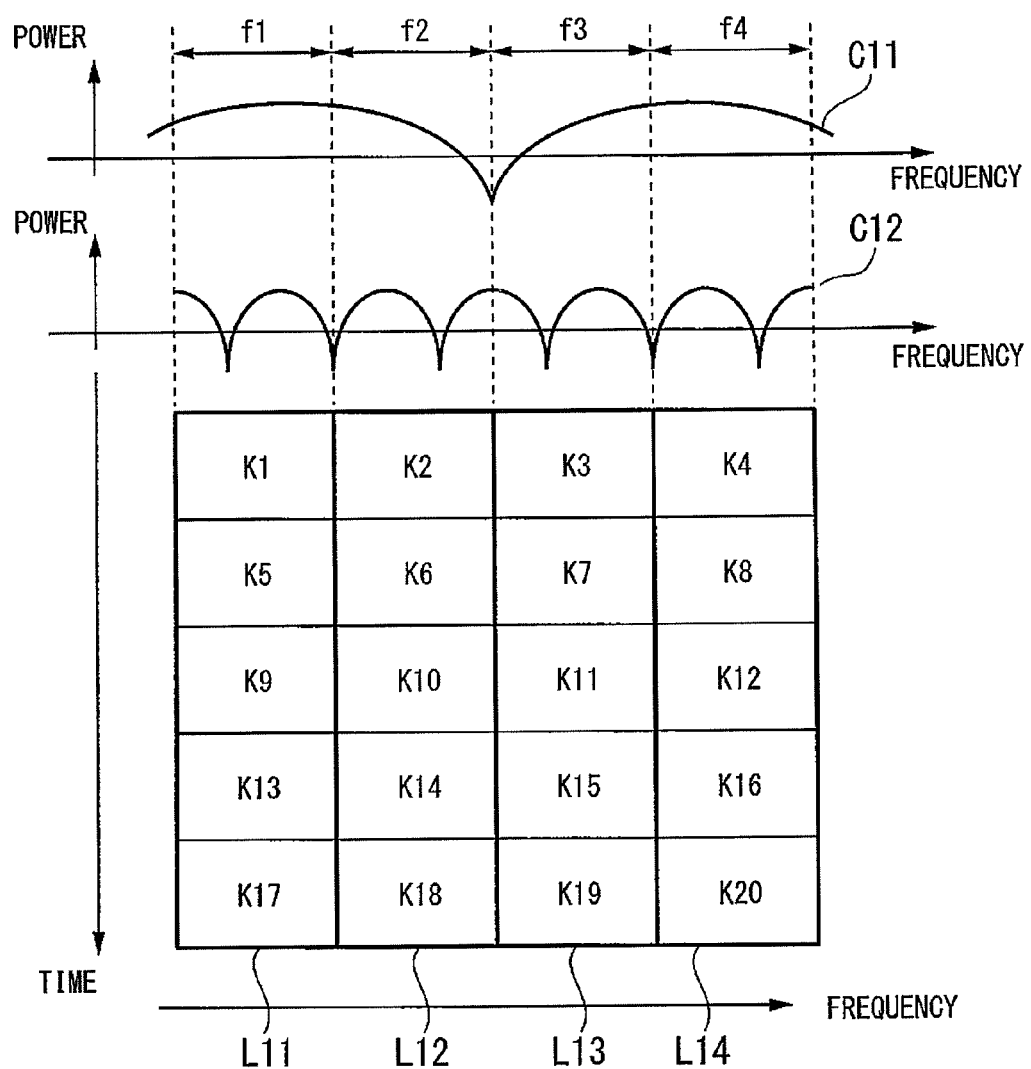
FIG. 10 shows transfer functions C11 and C12 of terminal unit 12 in the above embodiment for multiuser diversity region and frequency diversity region, respectively, in conjunction with the makeup of the chunk.

FIG. 10 shows in its upper portion transfer functions C11 and C12 observed in the multiuser diversity region and in the frequency diversity region, respectively, with the rf signal power and frequency taken along the vertical and the horizontal axes, respectively. It will be noted in FIG. 10 that the transfer functions observed at the mobile terminal unit 12 of FIG. 9 are shown as transfer functions C11 and C12.

FIG. 10 also shows in its lower portion the manner similar to FIG. 1, in which chunks K1-K20 are assigned to the users for communication. In FIG. 10, the chunks are divided into four groups, i.e., a group L11 consisting of chunks K1, K5, K9, K13 and K17; a group L12 consisting of chunks K2, K6, K10, K14 and K18; a group L13 consisting of chunks K3, K7, K11, K15 and K19; and a group L14 consisting of chunks K4, K8, K12, K16 and K20; with the groups L11 and L13 covering the multiuser diversity region and with the groups L12 and L14 covering the frequency diversity region.

It follows therefore that when the transfer function of the transmission path is calculated for mobile terminal unit 12 using the common pilot signal CPICH of the chunk included in the group L11, the portion of the transfer function C11 lying in the frequency band f1 is observed. Similarly, when the transfer function of the transmission path is calculated using the common pilot signal CPICH of the chunk included in the group L12, the frequency band f2 portion of the transfer function C12 is observed and, when the transfer function of the transmission path is calculated using the common pilot signal CPICH of the chunk included in the group L13, the frequency band 13 portion of the transfer function C11 is observed and, when the transfer function of the transmission path is calculated using the common pilot signal CPICH of the chunk included in the group L14, the f4 portion of the transfer function C12 is observed. It is noted here that the division of chunks K1-K20 into groups L11-L14 for assignment to the multiuser diversity region and the frequency diversity regions may be kept unchanged from the system design stage or may be dynamically changed depending on how the mobile terminal units are used (the number of such units, that of high-speed mobile units and the amount of data being transmitted, etc.).

Figure 11:
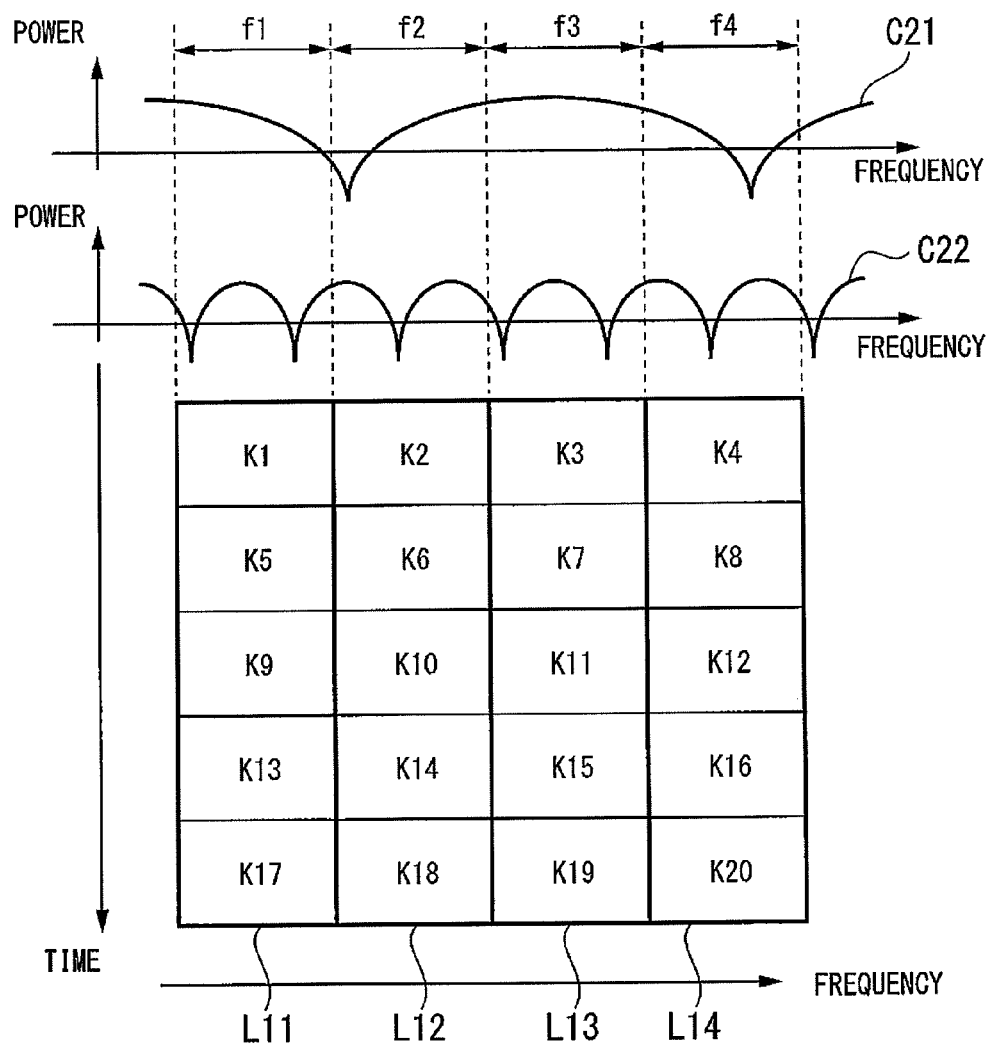
FIG. 11 shows transfer functions C21 and C22 of terminal unit 14 in the above embodiment for multiuser diversity region and frequency diversity region, respectively, in conjunction with the makeup of the chunk.

FIG. 11 shows the transfer function as observed at the mobile unit 14 shown in FIG. 9, and the division of the chunks into groups. More specifically, the upper portion of FIG. 11 shows transfer functions C21 and C22 observed in the multiuser diversity region and the frequency diversity region, respectively, with the rf signal power and frequency taken along the vertical and the horizontal axes, respectively. It will be noted from the comparison of FIGS. 10 and 11 that transfer functions C21 and C22 differ from transfer functions C11 and C12 due to the difference in location where the transmission path is observed.

FIG. 11 also shows in its lower portion the manner similar to FIG. 10 in which the chunks K1-K20 are assigned to the users for communication. In FIG. 11, the chunks are divided into four groups, i.e., the group L11 consisting of the chunks K1, K5, K9, K13 and K17; the group L12 consisting of chunks K2, K6, K10, K14 and K18; the group L13 consisting of the chunks K3, K7, K11, K15 and K19; and the group L14 consisting of the chunks K4, K8, K12, K16 and K20; with the groups L11 and L13 covering the multiuser diversity region and with the groups L12 and L14 covering the frequency diversity region.

It follows therefore that when the transfer function of the transmission path is calculated, as in the case of FIG. 10, for mobile terminal unit 14 using the common pilot signal CPICH of the chunk included in the group L11, the frequency band f1 portion of transfer function C21 is observed. Similarly, the frequency band f2 portion of the transfer function C22, the frequency band f3 portion of the transfer function C21, and the frequency band f4 portion of the transfer function C22 are observed, when the transfer function of the transmission path is calculated using the common pilot signal CPICH of chunk included in the groups L12, L13 and L14, respectively.

If information indicative of the quality of a received signal is transmitted from each of the mobile units to the base station as a part of the Channel Quality Indicator (CQI) signal, the comparison is performed at the base station between groups L11 and L13 for the mobile terminal 12, i.e., between the frequency band f1 portion and the frequency band f2 portion of the transfer function C11 for the quality of received signal and, based on the comparison results, the base station assigns group L11 (or frequency band f1) to mobile terminal 12 for transmission of the rf signal.

In the case of mobile terminal 14, the base station performs the received signal comparison between the groups L11 and L13, i.e., between the f1 portion of transfer function C21 and the f3 portion of transfer function C21 and, based on the comparison results, assigns the group L13 (or frequency band f3) to the mobile terminal 14 for transmission of the rf signal.

It will be understood from the foregoing that even when a mutually different delay time is inserted at the base station on a transmit antenna-by-transmit antenna basis for the frequency diversity region and the multiuser diversity region, an appropriate chunk can be assigned to each of the mobile terminal units to achieve an adequate multiuser diversity effect by applying the scheduling based on the CQI signal supplied from each of the mobile terminal units, with the frequency diversity region and the multiuser diversity region determined in advance and with the common pilot signal contained therein having the above-mentioned mutually different delay time introduced on a transmit antenna-by-transmit antenna basis.

Description will now be given on the situation where the initial phase of the rf signal transmitted from at least one of the antennas is changed on a slot-by-slot basis or on a basis of a plurality of slots.

Figure 12:
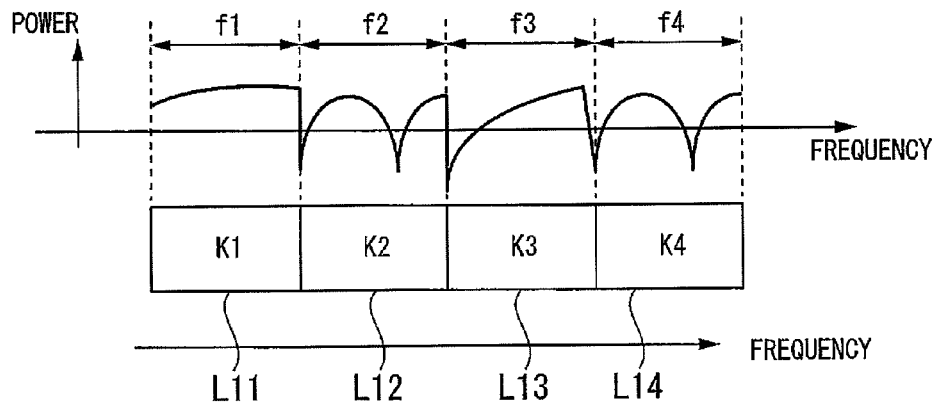
FIG. 12 shows a transfer function for chunks K1 to K4 associated with terminal unit 12 in the embodiment.

FIG. 12 shows transfer function of actual transmission path observed at mobile terminal 12 involving the chunks K1-K4 shown in FIG. 10. It will be noted in FIG. 12 that the f1 and f3 portions of the transfer function exhibit steep variation in frequency domain because the chunks K1 and K3, i.e., the groups L11 and L13, have a delay time applied thereto to achieve the multiuser diversity effect. On the other hand, the f2 and f4 portions of the transfer function exhibit more moderate variation in the frequency domain, compared with the f1 and f3 portions, because chunks K2 and K4, i.e., the groups L12 and L14 have a delay time applied thereto to achieve the frequency diversity effect.

Transfer functions of the transmission paths observed for mobile terminal units other than the terminal unit 12 similarly exhibit more moderate variation in the f2 and f4 portions than in the f1 and f3 portions. It will be noted however that the positions of the peak values in the transfer function differ from one terminal unit to another, because the multipath-based phase difference appearing in the transmitted signal components differs depending on where the terminal unit is located.

Figure 13:
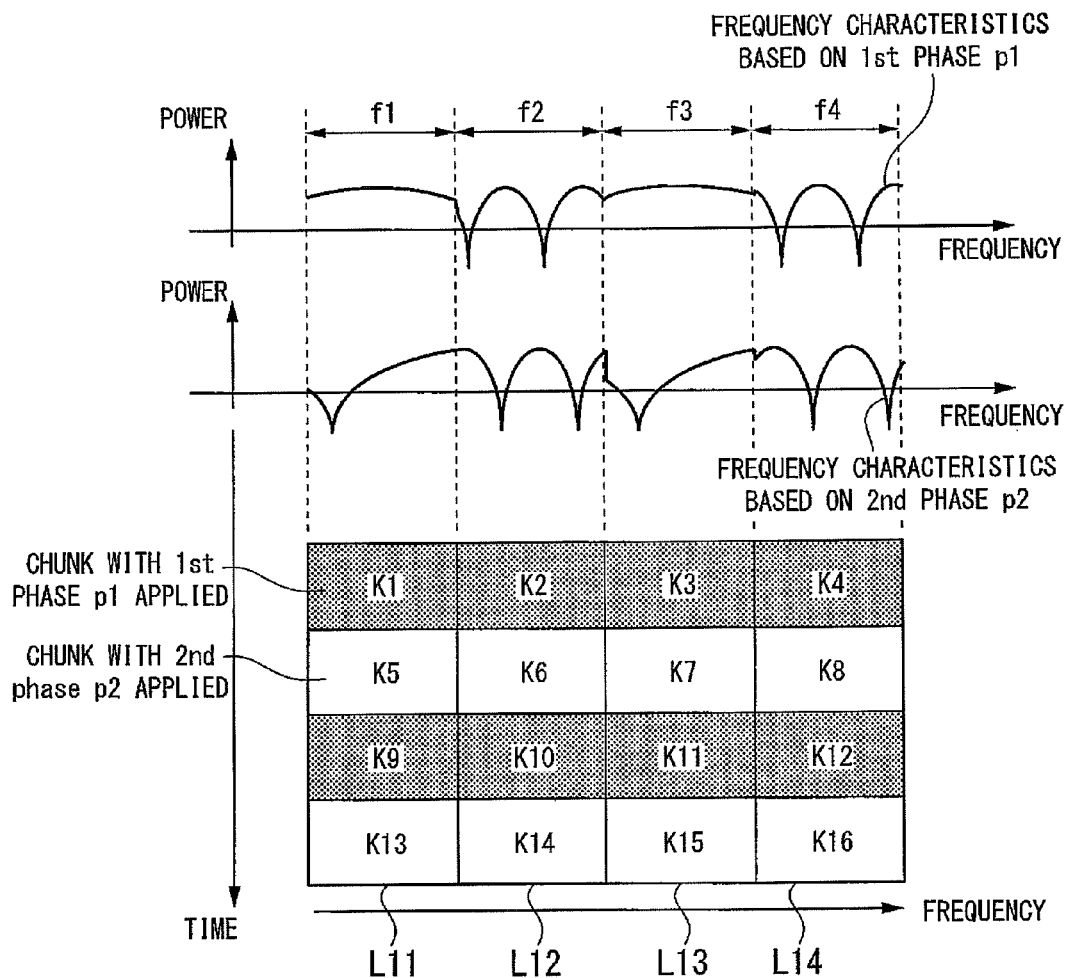
FIG. 13 shows transfer functions and the chunk makeup for the case where the initial phase of an rf signal transmitted from one antenna is selectively set on a slot-by-slot basis.

FIG. 13 illustrates how the initial phase is selectively set in the time domain on a slot-by-slot basis for the rf signal transmitted from at least one of the antennas. While it is assumed in the description below that two different initial phase amounts are selected, there may be more than two different initial phase amounts.

The lower portion of FIG. 13 shows the setting of the initial phase at a first phase p1 for the chunks K1 to K4 and K9 to K12, and the setting of the initial phase at a second phase p2 for the chunks K5 to K8 and K13 to K16.

The upper portion of FIG. 13 shows frequency characteristics of the transfer function for the initial phase of value p1 at terminal unit 12 and that for the initial phase of value p2 at the same terminal unit. It will be noted that the peak values of the frequency characteristic curves shift in frequency domain depending on the initial phase set on the rf signal side, due to the multipath interference.

As described above, while the transmission path conditions are estimated and the receive signal quality is measured on the basis of common pilot signals inserted on the transmit side to each of the chunks, the signal quality measurements differ depending on the initial phase selectively set on the transmit side, due to the common pilot signal being adversely affected by the multipath interference. When the transmission path is experiencing a low-rate variation, two different initial phase values may be alternately selected on a slot-by-slot basis as shown in FIG. 13, to thereby provide two different frequency characteristics alternately on a slot-by-slot basis.

Figure 14:
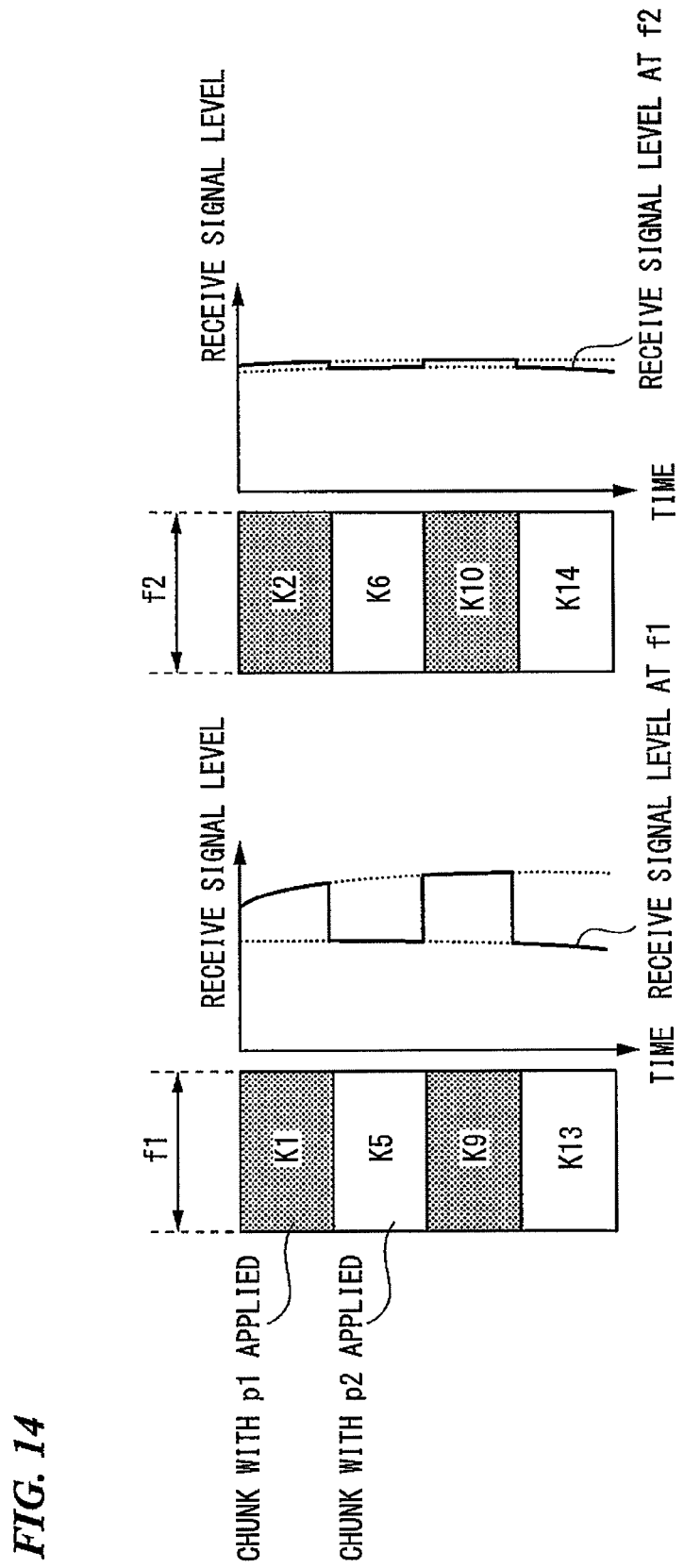
FIG. 14 shows the variation in receive signal level for the case where the initial phase is selectively set in the above embodiment depending on the multiuser diversity region and frequency diversity region.

The change in the values of initial phase results in the change in receive signal power level (receive signal quality) between the region where the delay time suited for achieving a multiuser diversity effect is selected and the region where the delay time suited for achieving the frequency diversity effect is selected. FIG. 14 shows an example of the receive signal level variation in the frequency band f1 where the delay time suited for achieving a multiuser diversity effect is selected, and that in the frequency band f2 where the delay time suited for achieving a frequency diversity effect is selected. As in the case of FIG. 13, the initial phase for the chunks K1, K2, K9 and K10 is p1, while the initial phase for the chunks K5, K6, K13 and K14 is p2.

In frequency band f1, a small delay is applied to achieve the multiuser diversity effect, with the result that the transfer function has a larger delay-induced variation in the frequency domain than in the frequency band f2. The peak values of the transfer function shift depending on whether the initial phase is p1 or p2. As a result, in the frequency band f1, where the transfer function exhibits a relatively large variation, the average receive signal power differs greatly depending on which is dominant, the higher peak value or the lower peak value. This results in the great variation in receive signal level appearing every time the initial phase is switched as shown on the left hand side of FIG. 14. It should be noted in this connection that, when the transmission path experiences only moderate change, the receive signal level exhibits very little change for the chunks K1 and K9 where the same initial phase is chosen. The same applies to the chunks K5 and K13.

On the other hand, in the frequency band f2, a greater delay is applied to achieve the frequency diversity effect, with the result that the delay-induced variation in transfer function is smaller than in the frequency band f1. Even in this case, the higher and lower peak value points of the transfer function shift depending on the initial phase values set at the transmitter. However, average receive signal power shows very little change because of the very little change in the number of the higher and lower peak values appearing in the frequency band. This is reflected in the right hand side of FIG. 14, where very little change is exhibited in receive signal power level even when the initial phase is switched.

It follows from the foregoing that an initial phase that provides a higher receive signal level can be selectively set at the transmitter by switching the initial phase particularly for those chunks where a large delay is applied.

Figure 15:
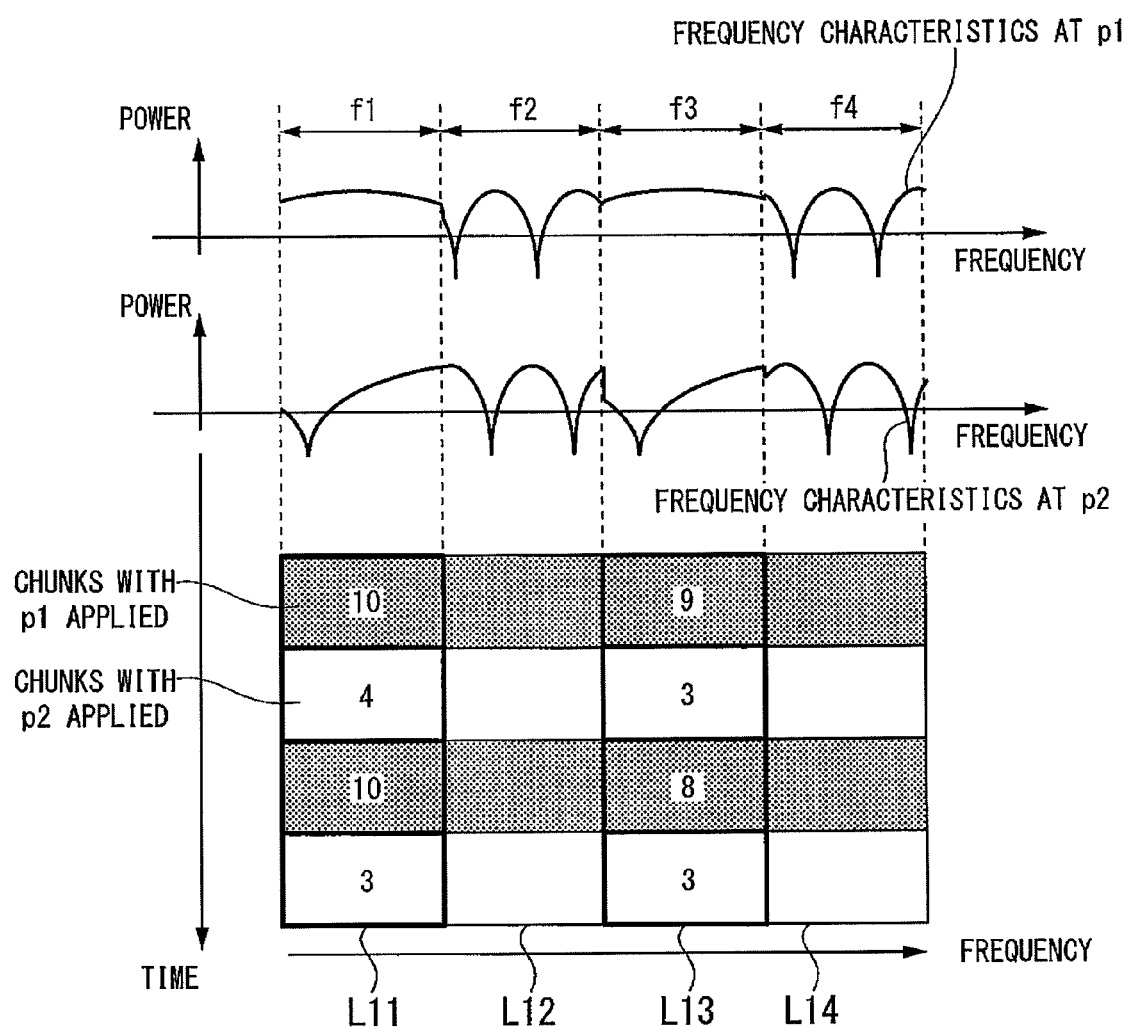
FIG. 15 shows an example of reported transmission rate values (CQI) for each of the chunks at terminal unit 12 in the embodiment.
Figure 16:
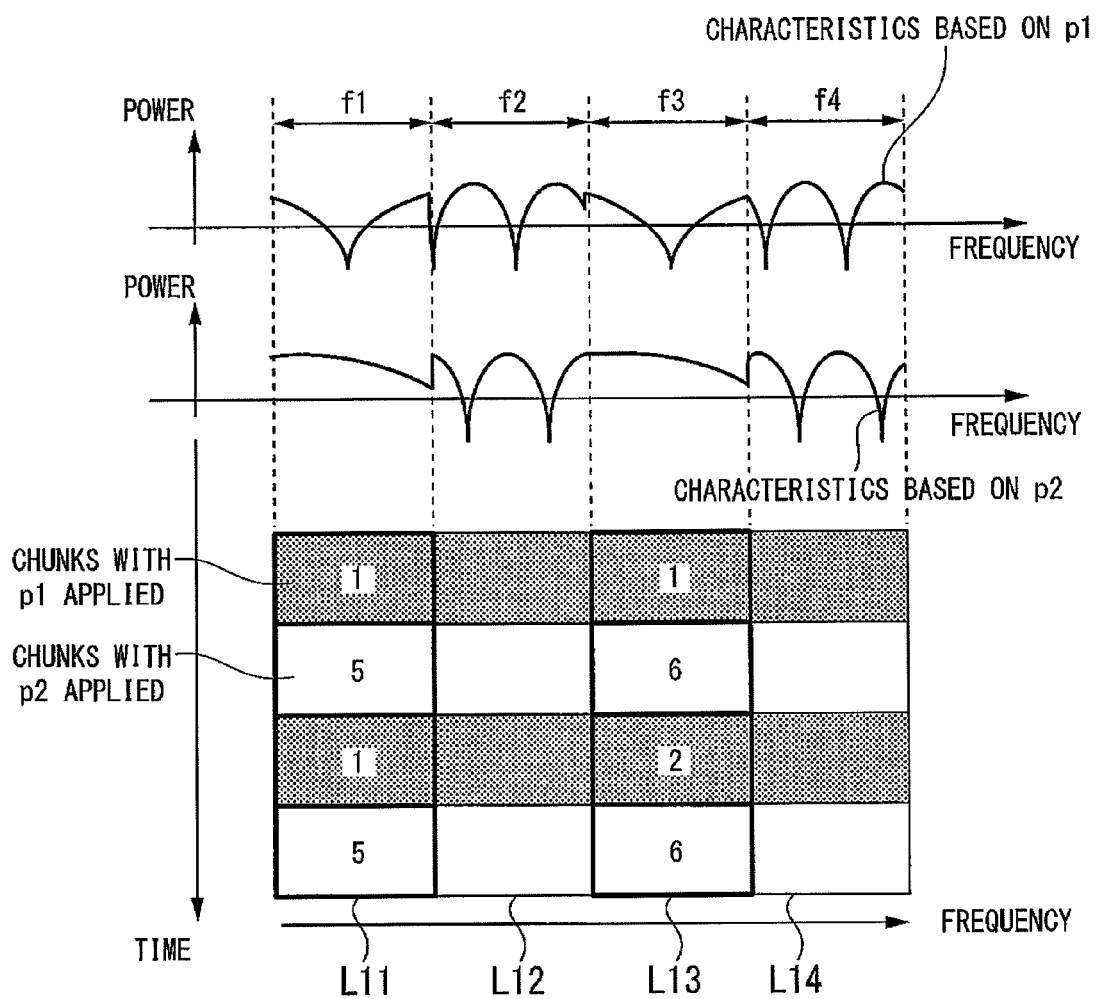
FIG. 16 shows an example of reported transmission rate values (CQI) for each of the chunks at terminal unit 13 in the embodiment.
Figure 17:
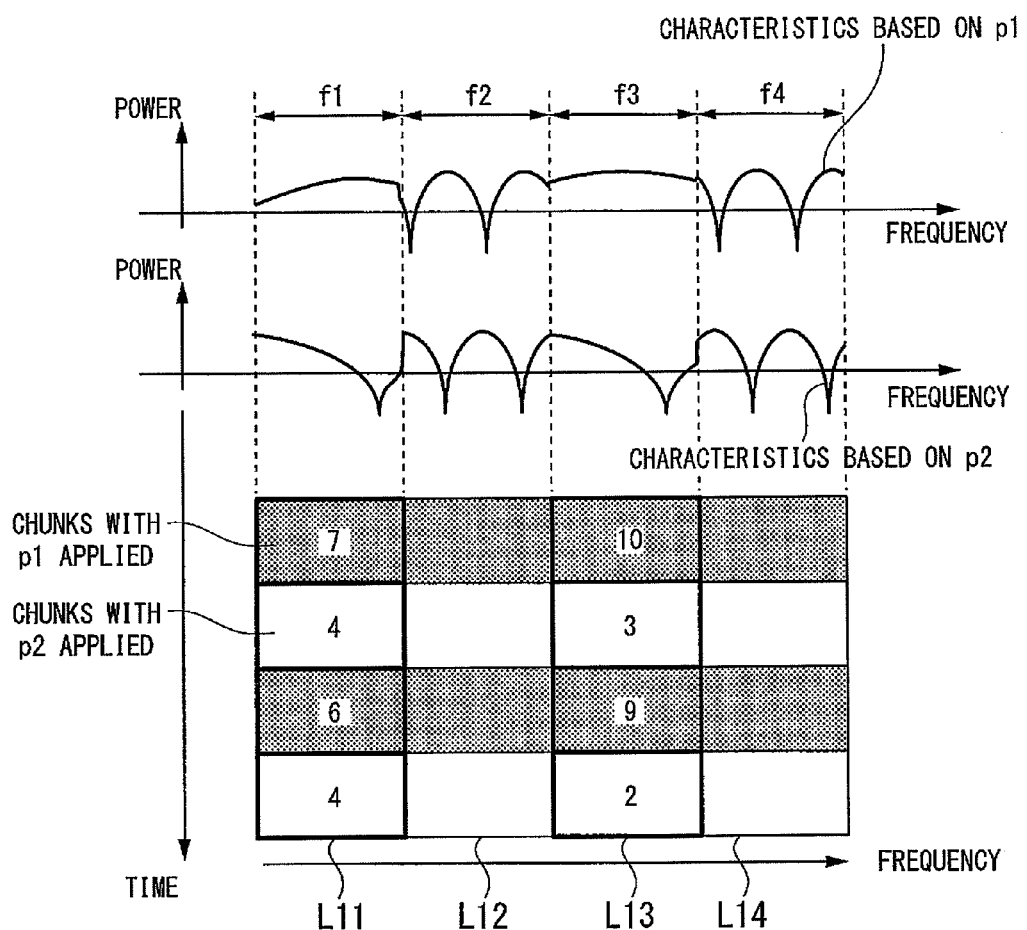
FIG. 17 shows an example of reported transmission rate values (CQI) for each of the chunks at terminal unit 14 in the embodiment.

On the other hand, an initial phase that provides a higher receive signal level varies depending on where the mobile unit is located because the locations involve mutually different transmission paths. FIGS. 15, 16 and 17 show examples of the reported transmission rate CQI for three different types of terminal units (terminal units 12, 13 and 14 shown in FIG. 9), which require the assignment of chunks suited for achieving a multiuser diversity effect. It will be noted that the higher the receive signal level is, the higher transmission rate can be demanded.

FIG. 15 shows in its upper part the frequency characteristics of the transfer function for the terminal unit 12 with the initial phase set at p1 and p2. When the initial phase is p1, the bands f1 and f3 (i.e., chunks K1, K3, K9 and K11) do not have any higher or lower peaks, resulting in a relatively large reported transmission rate values CQI as shown in the lower part of FIG. 15. When the initial phase is p2 on the other hand, the bands f1 and f3 (i.e., chunks K5, K7, K13 and K15) have lower peaks, resulting in a relatively small reported transmission rate values CQI.

FIG. 16 shows in its upper part the frequency characteristics of the transfer function for the terminal unit 13 with the initial phase set at p1 and p2. When the initial phase is p1, lower peaks are present for the chunks K1, K3, K9 and K11, resulting in a small reported transmission rate CQI shown in the lower part of FIG. 16. When the initial phase is p2 on the other hand, lower peaks are not present for the chunks K5, K7, K13 and K15, resulting in larger reported transmission rate CQI than when the initial phase is p1.

FIG. 17 shows in its upper part the frequency characteristics of the transfer function for the terminal unit 14 with the initial phase set at p1 and p2. With the general trend being similar to that of the terminal unit 12, the reported transmission rate CQI has a trend similar to that of the terminal unit 12 as shown in the lower part of FIG. 17. More specifically, the reported transmission rate CQI for the chunks K1, K3, K9 and K11 is larger than that for chunks K5, K7, K13 and K15.

If the initial phase is fixed, the receive signal level at any one of the terminal units is kept low for a while, resulting in the request for a lower transmission rate, eventually lowering the throughput of the transmission. For example, if the initial phase is fixed at p1, the receive signal level at the terminal units 12 and 14 is maintained at a favorable value, while that level at the terminal unit 13 is deteriorated. If the initial phase is fixed at p2 on the other hand, the terminal unit 13 only has a favorable receive signal level maintained, while the receive signal level at the terminal units 12 and 14 is deteriorated.

The above problem can be resolved by selectively setting the initial phase values alternatingly. Description will now be given on scheduling to be performed at the base station for switching the initial phase values cyclically in the time domain.

Each of the mobile units sends to the base station the reported transmission rate CQI, which forms the reception quality information in this embodiment. The base station performs the frame-by-frame scheduling on the basis of the information. A frame is intended to mean a unit consisting of a plurality of consecutive slots extending to a predetermined length of time and occupying the entire frequency band assigned thereto.

Figures 18A, 18B, 19:
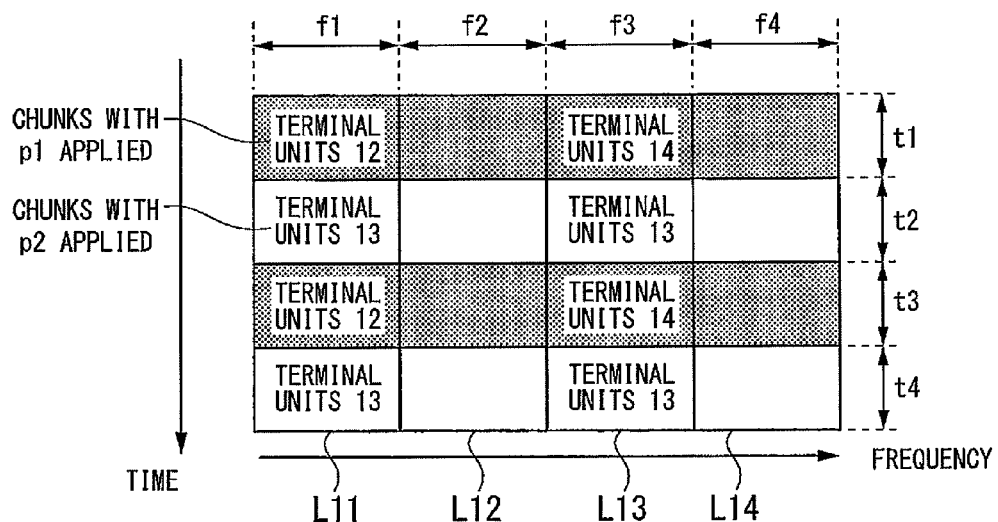
FIG. 18A shows an example of the prioritization of terminal units 12 to 14 in the embodiment with respect to phase p1.
FIG. 18B shows an example of the prioritization of terminal units 12 to 14 in the embodiment with respect to phase p2.
FIG. 19 shows an example of scheduling based on the prioritization shown in FIGS. 18A and 18B.

The base station averages the CPI values supplied from the terminal units to determine the priority of each of the terminal units on the basis of the averaged CPI values for each of the frequency bands associated with each of the initial phases. FIGS. 18A and 18B show how terminal units 12 to 14 are given the priority.

FIG. 18A shows the priority for the frequency bands f1 and f3 with the initial phase set at p1. More specifically, since the CQI values from the terminal unit 12 in the chunks K1 and K9 are 10 and 10, respectively, as shown in FIG. 15, the averaged CQI value for the terminal unit 12 in the frequency band f1 with the initial phase p1 is 10. Similarly, since the CQI values from the terminal unit 13 in the chunks K1 and K9 are 1 and 1, respectively, as shown in FIG. 16, the averaged CQI value for the terminal unit 13 in the frequency band f1 with the initial phase p1 is 1. On the other hand, since the CQI values from the terminal unit 14 in the chunks K1 and K9 are 7 and 6, respectively, as shown in FIG. 17, the averaged CQI value for the terminal unit 14 in the frequency band f1 with the initial phase p1 is 6.5. Thus, in terms of the averaged CQI values for the terminal units in the frequency band f1 with the initial phase p1, the priority is given in the order of the terminal units 12, 14 and 13. In a similar manner, in the frequency band f3 with the initial phase p2, the priority is given in the order of the terminal units 14, 12 and 13. Similarly, as shown in FIG. 18B, the priority is given in the order of the terminal units 13, 14 and 12 for the frequency band f1 with the initial phase p2, and the priority is given in the order of the terminal units 13, 12 and 14 for the frequency band f3 with the initial phase p2.

An example of the scheduling is shown in FIG. 19, assuming the priorities given as shown in FIGS. 18A and 18B. Further description will now be given, assuming the frame-by-frame scheduling described above. In a frame subjected to the scheduling, the chunk assignment is assumed to be performed in the order of terminal units with lower to higher transmission rates.

In the first round, the assignment is performed starting with terminal unit 12. More specifically, to the terminal unit 1 is assigned the chunk K1, which is in the frequency band f1 with the initial phase p1 and gives the highest priority for the terminal unit 12. Then, to the terminal unit 13 is assigned the chunk K7, which is in frequency band f3 with the initial phase p2 and gives the highest priority for the terminal unit 13. Then, to the terminal unit 14 is assigned the chunk K3, which is in the frequency band f3 with the initial phase p1 and gives the highest priority to the terminal unit 14. It is noted here that the total of the averaged transmission rate values for the chunks assigned to the terminal units are 10, 6 and 9.5 for the terminal units 12, 13 and 14, respectively. Subsequently to the first round assignment, the chunk assignment is performed in the order of terminal units with lower to higher total averaged transmission rate values. More specifically, to the terminal unit 13 is assigned the chunk K15, which is in the frequency band f3 with the initial phase p2 and gives the highest priority to the terminal unit 13. Since the total averaged transmission rate for the terminal unit 13 is 12, the chunk K11 in the frequency band f3 with the initial phase p1 giving the highest priority to the terminal unit 14, which involves the lowest total averaged transmission rate, is assigned to the terminal unit 14. Similarly, the chunk K9 is assigned to the terminal unit 12, while the chunks K5 and K13 are assigned to the terminal unit 13.

The scheduling performed in the manner described above reduces the transmission rate differences among the terminal units, securing unbiased scheduling.

Figure 20:
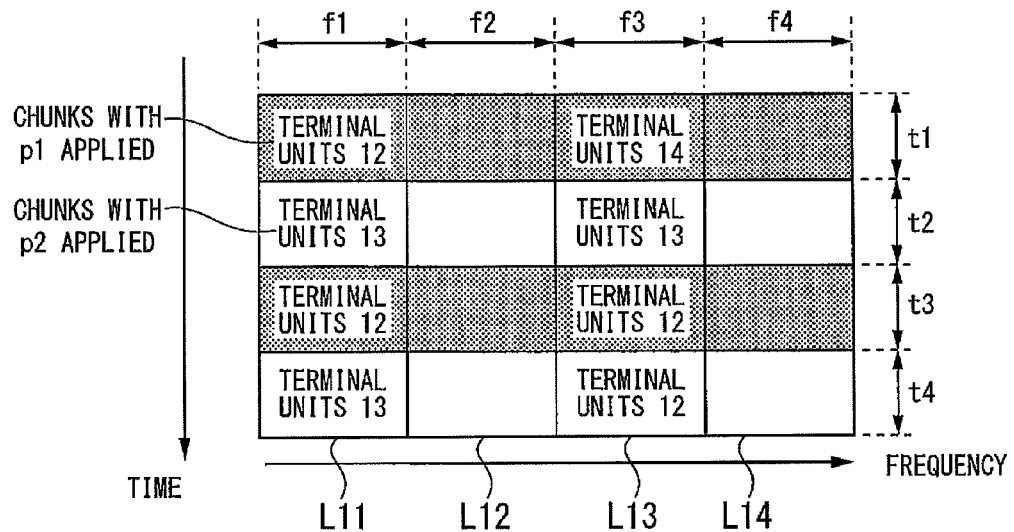
FIG. 20 shows another example of scheduling based on the prioritization shown in FIGS. 18A and 18B.

Another example of the scheduling is shown in FIG. 20, assuming the priorities given as shown in FIGS. 18A and 18B. The chunk assignment to the terminal units is performed for frames being scheduled, in the order of the chunks K1, K3, K5, K7, K9, . . . and K15. When the data assignment for transmission to a terminal of highest priority has already been completed, a terminal unit of the second highest priority will be assigned.

More specifically, to the chunk K1 in the frequency band f1 with the initial phase p1, is assigned the terminal unit 12 according to the priority shown in FIGS. 18A and 18B. Similarly, to the chunk K3 in the frequency band f3 with the initial phase p1, is assigned the terminal unit 14 according to the priority shown in FIGS. 18A and 18B. Data for transmission to the terminal unit 14 is assumed here to come to an end. Then, to the chunk K5 in the frequency f1 with the initial phase p2, is assigned the terminal unit 13 according to FIGS. 18A and 18B. Similarly, to the chunks K7 and K9, the terminal units 13 and 12, respectively. Although the terminal unit 14 is of highest priority in the chunk K11, the terminal unit 12 of the second highest priority is assigned to the terminal unit 12, because the data for transmission to the terminal unit 14 has already been completed. To the chunk K13 is assigned the terminal unit 13 according to FIGS. 18A and 18B. Data for transmission to the terminal unit 13 is assumed to be completed at this point in time. Although the terminal unit 13 is of the highest priority in the chunk K15, the terminal unit 12 of the second highest priority is assigned, because the data for transmission to the terminal unit 13 has already been completed.

The scheduling performed in the above manner in the order of the terminal unit of higher priority to that of lower priority improves the system throughput.

In the present embodiment, the assignment of chunks to the terminal units is performed in the manner described above based on the initial phase scheduling where the same initial phase value is chosen for every two consecutive slots.

While a method of scheduling has been described above by way of example, other methods may be employed as well. Even in those alternative methods, the switching of the initial phase in the time domain to give a greater variation in transmission path characteristics, brings about the effect of preventing the lasting deterioration of receive signal level.

In addition to the prevention of the continued deterioration in the receive signal level by the switching of the initial phase values, the scheduling performed in the manner described above makes it possible to assign to each of the terminal unit's chunks of favorable conditions. More definitely, the switching of the initial phase results in steeper variation in the receive signal level, permitting the multiuser diversity effect to be achieved.

Advantageous effects of the switching of the initial phase to achieve the multiuser diversity effect has been described above from the viewpoint that the multiuser diversity effect is achievable by causing steeper variations in the receive signal level. In the frequency diversity region, the advantages achievable from the switching of the initial phase are limited. Therefore, the switching of the initial phase may be applied only to achieve the region where the multiuser diversity effect is to be achieved. However, the effect of the multiuser diversity effect can be achieved, even when the switching of the initial phase is applied independently of the distinction between the frequency diversity region and the multiuser diversity region.

While the foregoing description of the embodiment is based on the assumption that the amount of delay is grouped in the frequency domain, with an initial phase having a fixed extension in frequency domain, the makeup of the embodiment is not limited to what has been described. More specifically, the amount of delay may be selected within a frame on a chunk-by-chunk basis. Mutually different initial phase values may be selected at the same timing on a chunk-by-chunk basis.

Figure 21:
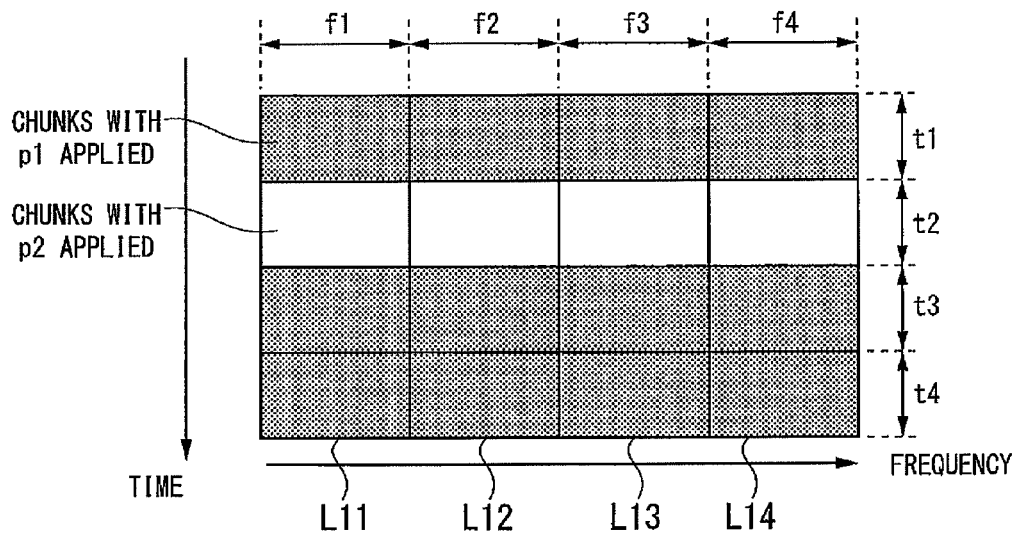
FIG. 21 shows the makeup of the chunk for the case where the proportion of the number of chunks to which the respective initial phases are applied is adaptively controlled.

The ratio of the number of chunks to which the initial phase values are applied as shown in FIG. 21 may be adaptively controlled on the basis of the receive signal level reported from each of the terminal units. In the example of FIG. 21, since the reported transmission rate CQI for phase value p1 chosen as the initial phase is larger than that for phase value p2 chosen as the initial phase, the ratio of the phase value p1 is set at a large value.

By setting the ratio of the initial phase, for which a higher receive signal level has been reported as described above, the system throughput can be improved.

Second Embodiment

While the frame-by-frame scheduling has been performed in the first embodiment described above, the slot-by-slot scheduling is performed in the second embodiment.

Figure 22:
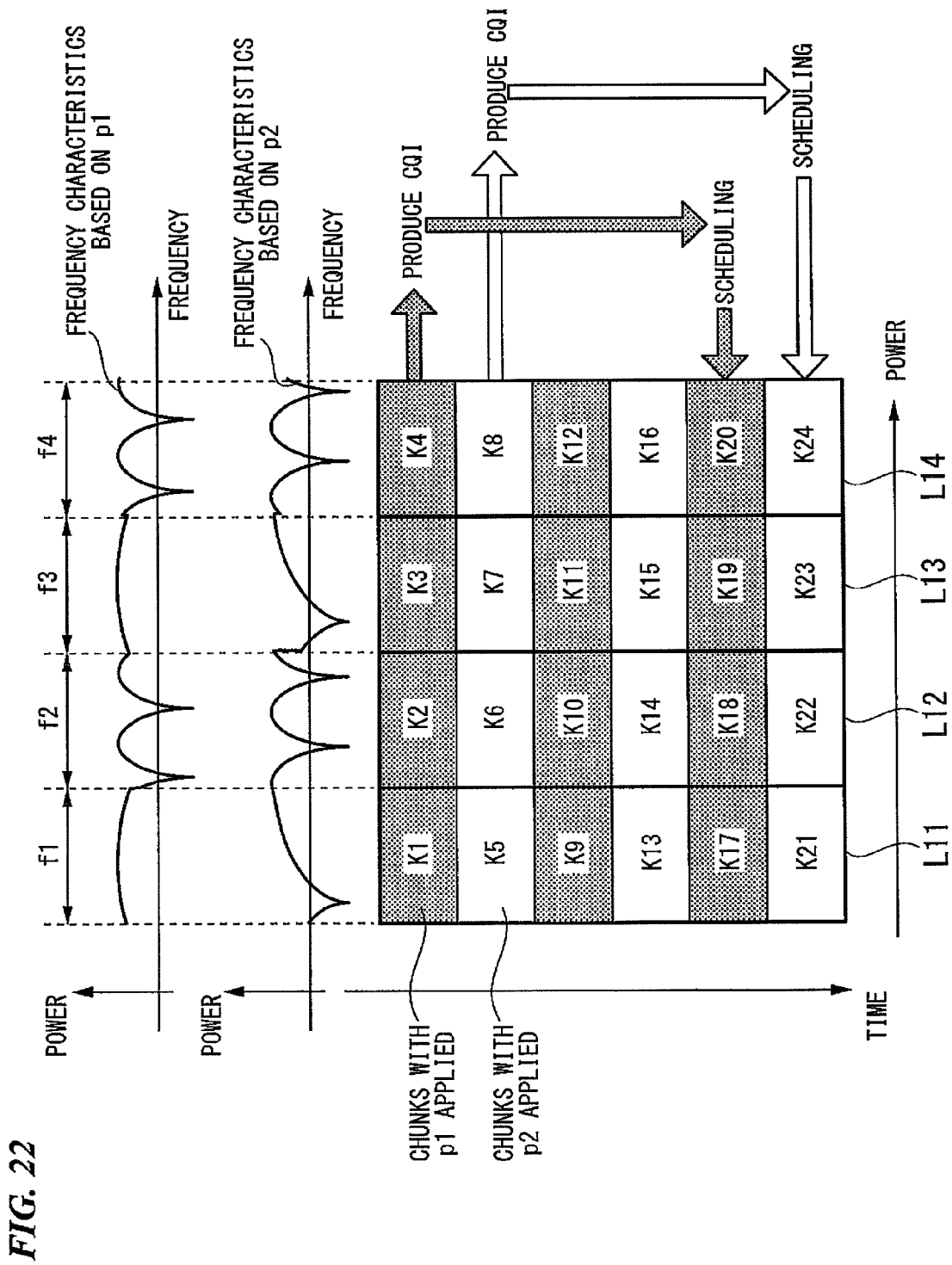
FIG. 22 shows how the initial phase is selectively set in the second embodiment of the present invention.

FIG. 22 shows how the initial phase values are switched. The round trip time RTT, which is the amount of delay involved in the scheduling, is 4 slots long. More definitely, assuming that a terminal unit produces the transmission rate value CQI from a received slot for sending to a base station including an rf signal transmitter of this embodiment and that the base station performs the scheduling on the basis of the CQI value supplied from that particular mobile unit, the slot assigned through the scheduling at the base station to that particular mobile unit is the fourth slot as counted from the slot which was referenced by that mobile unit for producing the CQI value for transmission to the base station. In FIG. 22, the repetition period Tco for the recursive switching of the initial phase is two slots long. In other words, a first slot and a second slot following the first one two-slot lengths later are of the same initial phase. Thus, the repetition period Tco is one half of a round trip time RTT.

As described above, the present embodiment is structured to have a repetition period Tco for the switching of the initial phase, which is equal to the round trip time RTT multiplied by the reciprocal of a natural number. Thus, the maximum number of the types of the initial phase is equal to the number of slots over which the RTT extends.

As shown in FIG. 22, the terminal unit 12 shown in FIG. 9, for example, measures the receive signal quality for the chunks K1 and K3, which belong to the group L11 with the initial phase set at p1 and the group L13, respectively, and calculates the transmission rate CQI for the chunks K1 and K3, for transmission to the base station. Based on the supplied CQI value, the base station performs the scheduling for the chunks K17 and K19, which belong to the group L11 with the initial phase set at p1 and the group L11, respectively, and transmits the data through modulation/coding on the basis of the reported transmission rate. Since the chunk K1 and K17 have the same initial phase and the same amount of delay applied thereto and since the chunks K3 and K19 have the same initial phase and the same amount of delay applied thereto, the receive signal quality does not vary significantly, so long as the transmission path involves relatively small variation with time. As a result, the scheduling can be performed efficiently.

Figure 23:
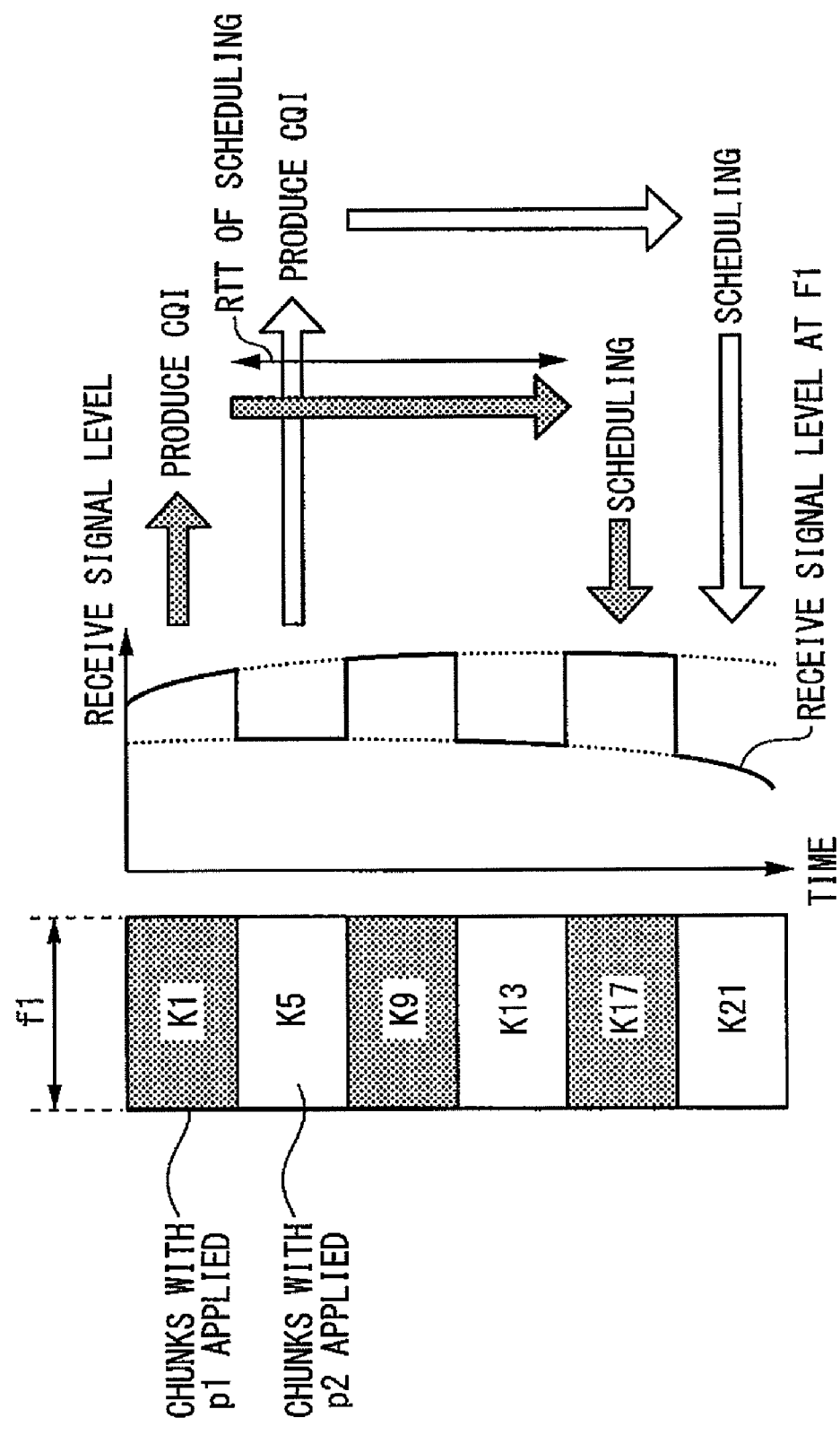
FIG. 23 shows the relationship between the receive signal level variation and the scheduling round trip time RTT for the second embodiment.

FIG. 23 shows an example of the relationship between the fluctuation of the receive signal level and the round trip time RTT for the scheduling. The relationship illustrated for the frequency band f1 is applicable to other frequency bands. The receive signal level for the terminal unit 12 in the frequency band f1 is low when the phase p2 is applied compared with when phase p1 is applied. Since the large receive signal level fluctuation is due to the switching of the initial phase, the repetition period of a significant receive signal fluctuation depends on the period at which the initial phase is switched. With the phase values p1 and p2 selectively set at the two-slot long repetition period, the receive signal level undergoes significant fluctuations at the two-slot long repetition period. The transmission rate value CQI calculated from the receive signal level for each of the chunks is used for the scheduling performed in the chunk a four-slot long period later.

Figure 24:
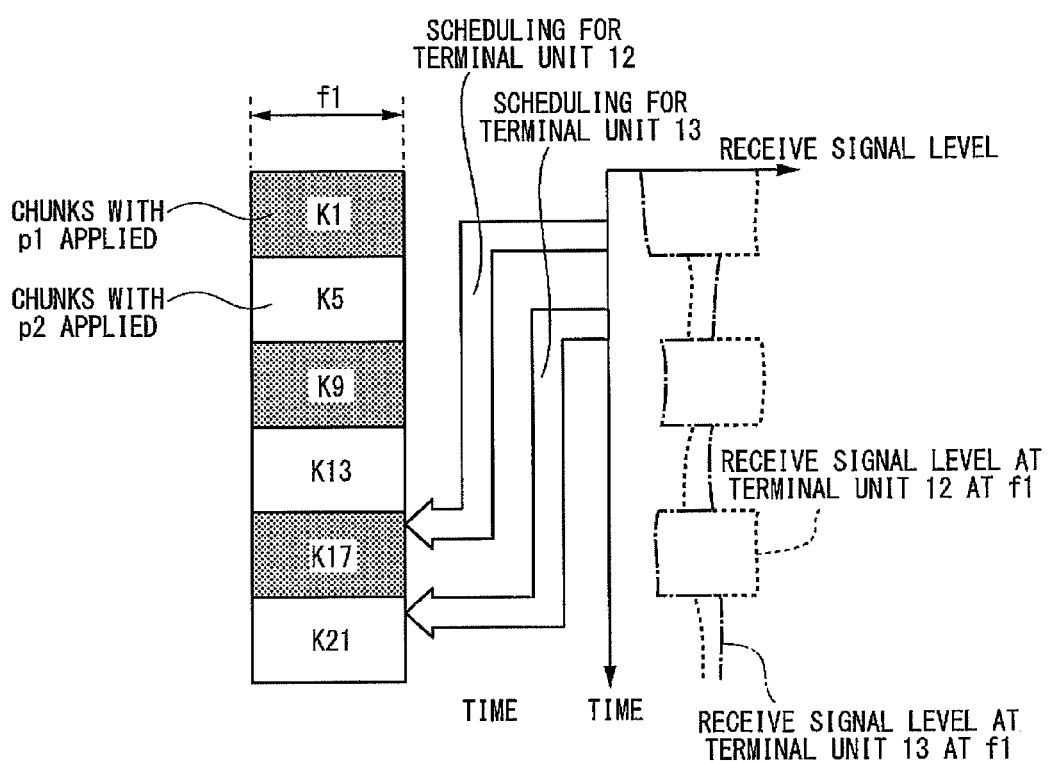
FIG. 24 shows an example of the receive signal level variation at terminal units 12 and 13 in the embodiment.

FIG. 24 shows an example of the receive signal level fluctuation at the terminal units 12 and 13.

Since the terminal unit 13 is located further from the base station than the terminal unit 12 is, the average receive signal level is lower for the terminal unit 13 than for terminal unit 12. However, when the initial phase is switched at the base station, the receive signal levels viewed on a slot-by-slot basis may become higher for the terminal unit 13 than the terminal unit 12. In the example shown in FIG. 24, the receive signal level is lower for terminal unit 13 than for the terminal unit 12 when the initial phase is p1, while the receive signal level is higher for the terminal unit 13 than for the terminal unit 12 when the initial phase is p2. Since the receive signal level in the chunk K1 is higher for the terminal unit 12 than for the terminal unit 13, the transmission rate CQI reported in chunk K1 from the terminal units is greater for the terminal unit 12. Therefore, the scheduling performed at the base station based on the reported CQI results in a higher priority given to the terminal unit 12 whose reported transmission rate is higher. Thus, to the chunk K17 after the lapse of the round trip time RTT is assigned the terminal unit 12. On the other hand, since the phase p1 is applied as the initial phase to the chunk K17 similarly to the chunk K1, the receive signal level is higher for the terminal unit 12 than for the terminal unit 13. As a result, the required error ratio is satisfied to enable highly efficient data transmission. In a similar manner, the terminal unit 13 is assigned to the chunk 21 for which the scheduling is performed on the basis of the chunk K5. This results in the assignment of a terminal unit of a higher receive signal level to chunk K21.

As described above, the switching of the initial phase in this embodiment at the repetition period of Tco results in a significant variation in the transfer function. By setting the period Tco at a length equal to two slots, which is one half of the four-slot long round trip time RTT in this embodiment, and by assigning at the base station to each of the terminal units the chunks based on the above setting of the repetition period, the assignment of the chunks to the terminal units can be performed in an unbiased manner. Furthermore, since the assignment can be made to the chunks with the initial phase, which provides higher receive signal level, the multiuser diversity effect can be achieved, enhancing the system throughput.

On the other hand, if the initial phase switching is performed without taking the round trip time RTT into account, the scheduling can be erroneously performed for a chunk with the phase p2 applied as the initial phase, on the basis of the reported transmission rate CQI for a chunk with the phase p1 applied as the initial phase. Under this state, since the initial phase associated with the chunk forming the basis for the scheduling differs from that associated with the chunk being scheduled, the transfer function of the associated transmission paths may come to fluctuate, resulting in a significant difference in the receive signal quality. More specifically, if the chunk forming the basis of the scheduling is in a favorable state in terms of the receive signal quality while the chunk being scheduled is suffering deteriorated receive signal quality, the error rate will increase due to the assignment of a terminal unit associated with a deteriorated transmission path. In contrast, if the chunk forming the basis of the scheduling is suffering deterioration in receive signal quality while the chunk being scheduled in a favorable receive signal quality state, the scheduling cannot assign a terminal unit in a better receive signal state, adversely affecting the spectral efficiency.

As described above, the setting of the repetition period Tco at a value equal to the round trip time RTT multiplied by the reciprocal of a natural number makes it possible to perform optimal scheduling while achieving the enhanced system throughput based on the initial phase switching or further unbiased scheduling for the terminal units. Compared with the first embodiment, the performance of the scheduling at a shorter repetition period provides the scheduling, which is responsive to faster fluctuation in the transmission path characteristics.

While the scheduling in the above embodiment is performed by assigning a terminal unit of the higher reported transmission rate value CQI, the proportional fairness method may be employed in place of the above assigning method, thereby to assign the chunks to the terminal units in a more unbiased manner. This is because even a terminal unit, which is located far away from the base station and which consequently has a very low average receive signal level, can have a sufficiently high instantaneous value of the transfer function relative to the average value, due to the fact that the initial phase switching causes the transfer function to fractuate significantly, thereby changing the instantaneous value of the transfer function relative to its average value.

Figure 25:
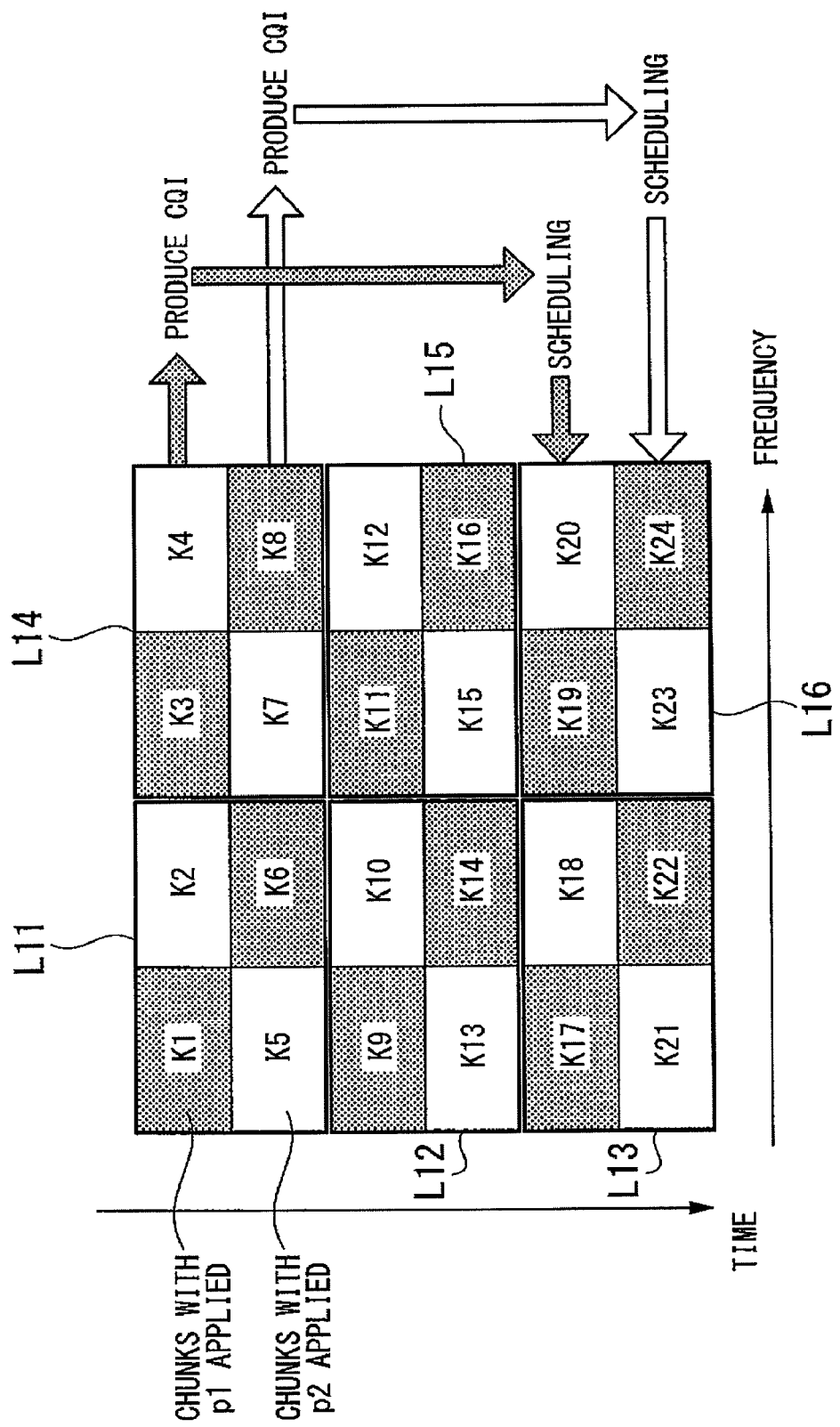
FIG. 25 shows an example of scheduling for the case where a mutually different initial phase is set for each of the chunks in the embodiment.

It has been assumed in the above embodiment that the lengths of the delay time are grouped in terms of frequency while the initial phase is fixed in terms of frequency. However, the delay time lengths maybe selected on a chunk-by-chunk basis within a frame as shown in FIG. 25. Even in the case where mutually different initial phases are selected on a chunk-by-chunk basis for the same timing, the similarly advantageous effect can be achieved so long as the conditions are met where both the delay time length and the initial phase become identical at the repetition rate of RTT for each of the chunks.

Third Embodiment

Figure 26:
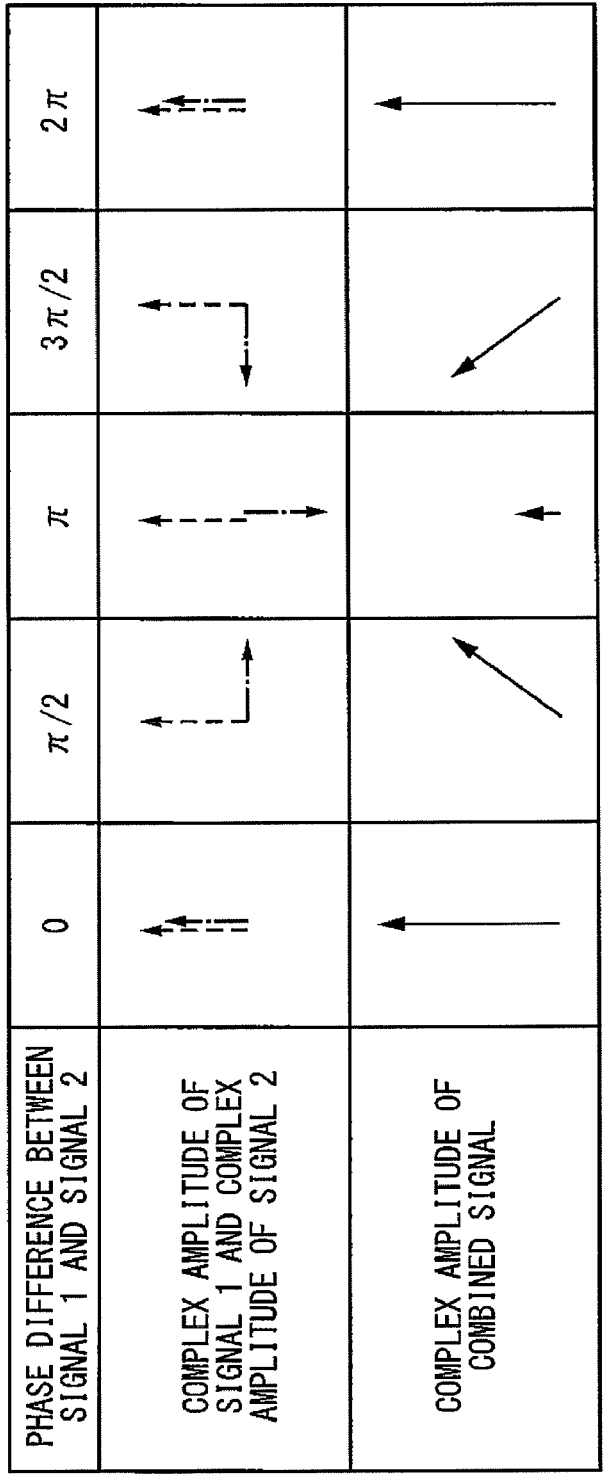
FIG. 26 shows an example of the phase difference of two signals and the complex amplitudes of the two signals as combined.

A third embodiment will now be described in conjunction with a specific method of the initial phase switching. FIG. 26 shows the phase difference of two signals and complex amplitudes of the combined signal. If the phase difference between signals 1 and 2 is 0, the combined signal has a maximum amplitude in the state where the vectors indicative of the complex amplitudes are in the same direction. As the phase difference increases, the amplitude of the combined signal decreases gradually to reach a minimum value for the phase difference of E. As the phase difference further increases beyond $\pi$, the amplitude of the combined signal increases to reach a maximum value for the phase difference of $2\pi$.

As described above, the amplitude between the combined signal exhibits the variation with the change in phase difference between then two signals from 0 to $2\pi$. More specifically, when four different initial phase values are to be switchably set by two antennas, the antenna-to-antenna phase difference may be selected from 0, $\pi/2$, $\pi$, $3\pi/2$ and $\pi$ to achieve the objective and thereby to bring about the adequate change in the combined signal amplitude.

Figure 27:
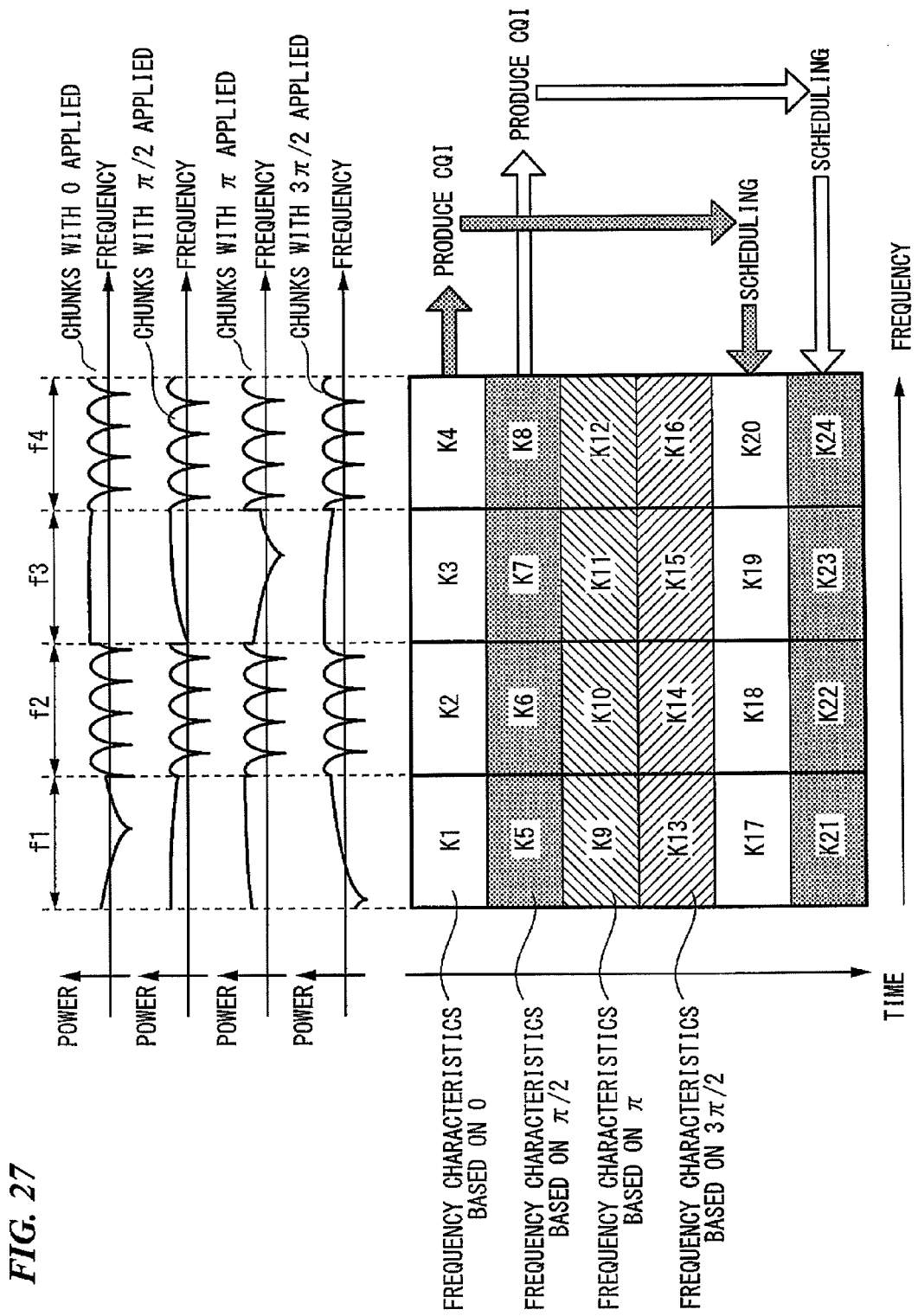
FIG. 27 shows frequency characteristics and the chunk makeup for the case where four different initial phases are used in the third embodiment of the invention.

FIG. 27 shows an example of the switchable setting of the above-mentioned four initial phases. Every time the phase difference is changed by $\pi/2$, the positions of the upper and lower peaks of the transfer function is shifted by a quarter of the upper-to-lower peak pitch and, when the phase difference is $\pi$, the positions of the upper peaks and those of the lower peaks in the frequency characteristics are reversed relative to those for 0 phase difference. Furthermore, when the phase difference is $3\pi/2$, the positions of the upper peaks and those of the lower peaks in the frequency characteristics are reversed to those for π/2 phase difference. To generalize, assuming the switchable setting of n different initial phases, the use of the n different initial phases ranging from 0 to 2π(1−1/n) at an interval of 2π/n makes it possible to uniformly maximize the initial phase-based upper peak-to-lower peak shifts in the transfer function.

The initial phase switching performed in the order of 0, π/2, π, 3π/2 as shown in FIG. 27 need not be in that order. Similarly, the initial phase assumed in the above description to be of constant value in the frequency domain need not be that way, so long as the condition is met that both the delay time length and the initial phase become identical at an interval of RTT for every chunk. For example, instead of setting an initial phase of an antenna at a fixed value, the initial phase applied to two antennas, respectively, may be selectively set for both antennas, in such a manner that the first antenna may receive the change in the order of 0, π/2, π, 3π/2, while the second antenna may receive the change in the order of 0, π, 2π, 3π, thereby to provide the change in the order of 0, π/2, π, 3π/2.

The two transmit antennas employed in this embodiment may be replaced by more than two such antennas, with at least one of them adapted to the switched initial phase to achieve comparable results.

For example, if four transmit antennas are employed, one of them may have the initial phase switched in the manner described above. Alternatively, the initial phase may be switched only for the third and the fourth antennas thereby to provide the phase difference 0, π/2, π and 3π/2 in that order, relative to the initial phase of the first and the second antennas, with that for the first and the second antennas left unswitched. It will be noted here that as the fluctuation of the receive signal level at the terminal unit increases, the multiuser diversity effect can be achieved.

It will also be noted that the method of selecting the initial phase described for the present embodiment can be applied to the first and the second embodiments.

Fourth Embodiments

The operation of the first to the third embodiments described above will now be further described in conjunction with the fourth embodiment, referring to additional drawings. The base station unit, i.e., the transmitter unit of this embodiment is shown in FIG. 4. The base station unit includes a packet data convergence protocol (PDCP) unit 15, a radio link control (RLC) unit 16, a media access control unit 17 and a physical layer 18. The PDCP unit 15 receives IP data packets, compress them, transfers the compressed IP data packets to the RLC unit 16. Also, the PDCP unit 15 receives from the RLC unit 16 data and decompress their headers to restore them, The RLC unit 16 transfers data received from the PDCP unit 15 to the MAC unit 17. Also, the RLC unit 16 transfers data received from the MAC unit 17 to the PDC unit 15. The MAC unit 17 performs the automatic repeat request (ARQ) processing, the scheduling-related processing, the data combining/separation, and the control over the physical layer 18, thereby to transfer data received from the RLC unit 16 to the physical layer 18 while transferring data received from the physical layer 18 to the RLC 16. The physical layer 18 performs the conversion of transmission data received from the MAC unit 17 into an rf transmit signal, and the reception of an rf receive signal into the MAC unit 17, under control by the latter.

The MAC unit 17 includes a scheduler 19 for determining an assigned chunk for communication with the terminal units which are to be in communication with the base station, and a transmit unit controller 20 for controlling a transmit unit 21 using the subcarrier assignment information based on chunk assignment information supplied from the scheduler 19, for controlling the antenna-to-antenna maximum delay responsive to frequency diversity/multiuser diversity indicating signal, depending on the frequency diversity region or a multiuser diversity region, and for controlling the initial phase at each of the antennas (or, more simply, the antenna-to-antenna initial phase difference) responsive to the initial phase information.

The physical layer 18 includes: the transmit unit 21 for performing modulation under the control by the controller 20 in response to data received from the MAC unit 17, thereby to produce the data-modulated transmit subcarrier; an rf frequency conversion unit 23 for frequency-converting the transmit subcarrier upward into higher frequency rf signals and for frequency-converting receive rf signals from antennas 24-26 downward into lower frequency rf signals for processing at a receive unit 22, which demodulates the frequency-converted signal received from frequency conversion unit 23 and provide the demodulation output to the MAC unit 17, and antennas 24-26 for transmission and reception of transmit and receive signals from/to the rf signal frequency conversion unit 23.

As described above, the transmitter of this embodiment includes the transmit unit controller 20, the transmit unit 21 and the rf frequency conversion unit 23.

For further details of the makeup of the structural elements of the embodiment described above, except for the scheduler 19, the transmit unit controller 20 and the transmit unit 21, reference is made to the publication listed below:

"Evolution of Radio Interface Protocol Architecture," June 2005, R2-51738, 3GPP (TSG RAN WG2 Ad Hoc).

Figure 28:
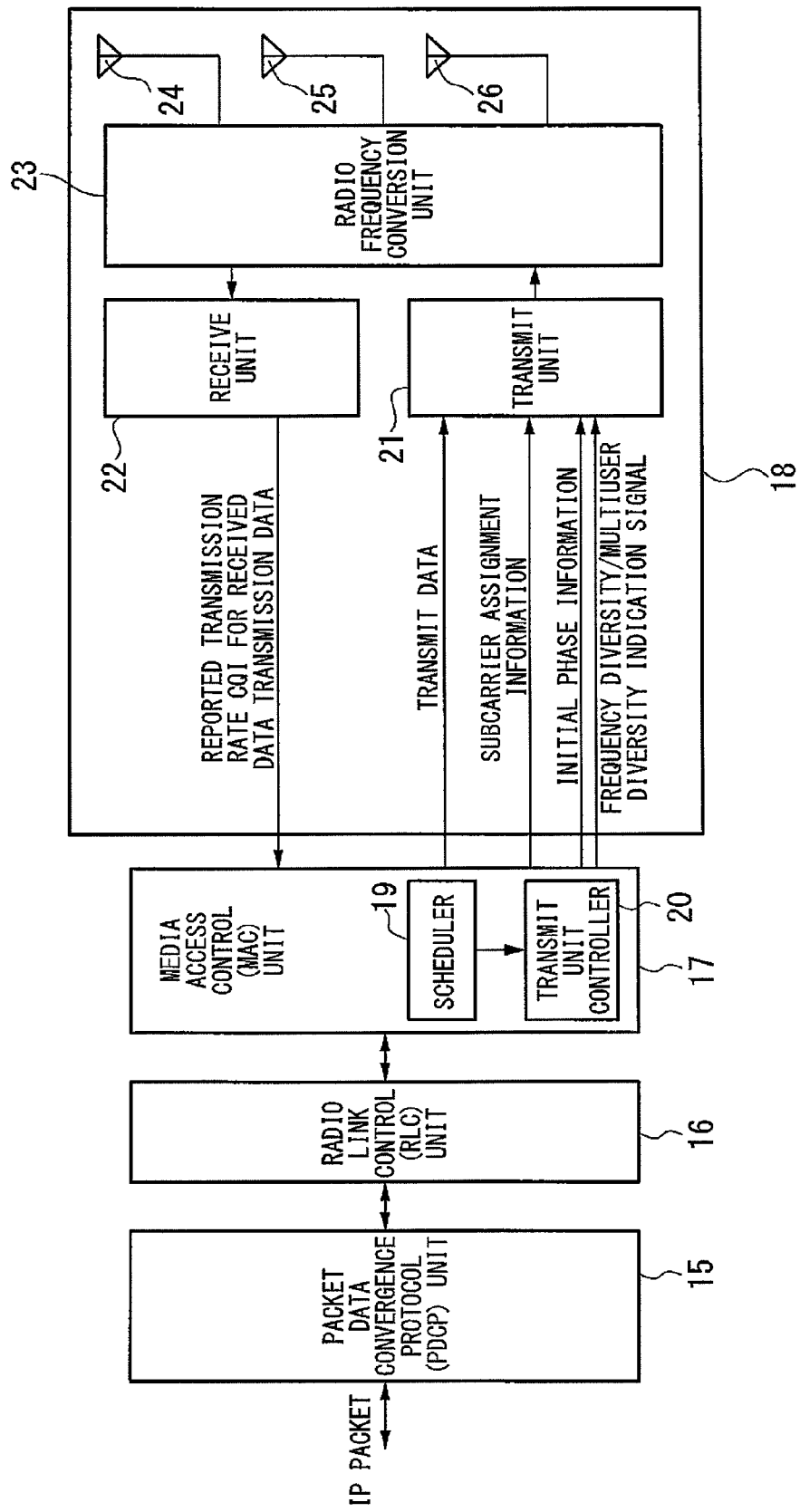
FIG. 28 shows in blocks the makeup of a base station unit according to the fourth embodiment of the invention.

The scheduling-related processing performed at the MAC unit 17 will now be described. As shown in FIG. 28, the MAC unit 17 includes the scheduler 19, which performs the scheduling-related processing including, as shown in FIG. 29, a step T2 for collecting the transmission rate information MCS contained in the reported transmission rate value CQI supplied from each of the terminal units, a step T3 for sequentially assigning the channels in the order of higher to lower transmission rates for the terminal units, a step T4 for providing to a transmit unit controller 20 channel assignment information provided through the step T3 above, and a step T5 for deciding whether the next frame (or slot) is to be transmitted and, depending on the decision, for returning to the step T2 above or proceeding to the step T6, which is to end the processing. It is to be noted here that the transmission rate information, which constitutes the receive signal quality, is acquired by the rf signal frequency conversion unit 23, the receive unit 22 and the MAC unit 17 for supply to the scheduler 19.

While it is assumed in the description above that the transmission rate information MCS (Mobile and Coding Scheme) is supplied to the base station, other information such as an average Signal to Interference and Noise Ratio (SINR) may be used in place of the MCS information, which represents the quality of the rf signal received at each of the terminal units from the base station.

Upon reception of the chunk assignment information through the step T5 of the processing at the scheduler 19 above, the transmit unit controller 20 controls, in response to the chunk assignment information, performs control over the transmit unit 22 for the transmission of a next frame, using the subcarrier assignment information.

FIG. 30 shows examples of the transmission rate information MCS associated with the process shown in FIG. 29. As shown in FIG. 30, the left-hand column shows the MCS information in numbers 1-10, which correspond to the type of modulation as applied and the coding rate for error correction codes. More specifically, the information MCS corresponds to the transmission rates shown in the right hand column, indicating that the larger the number indicated in FIG. 30, the higher is the transmission rate required by the terminal units.

Figure 31:
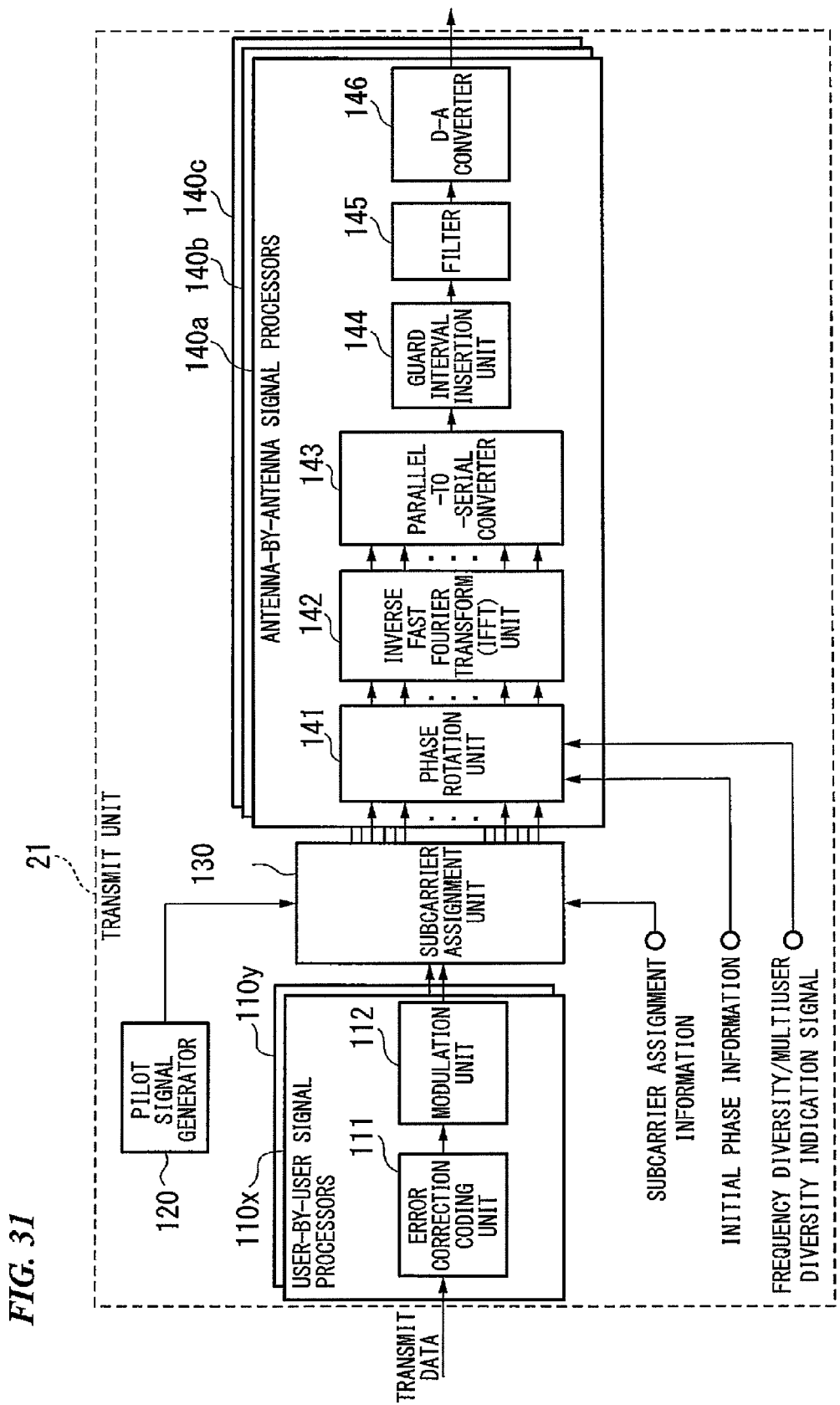
FIG. 31 shows in blocks the makeup of a transmit section 21 employed in the embodiment.

Referring to FIG. 31, there is shown a makeup of the transmit unit 21 shown in FIG. 29. As shown in FIG. 31, the transmit unit 21 includes signal processors 110$x$ and 110$y$ for performing signal processing on a user-by-user basis, a pilot signal generating unit 120 for producing pilot signals for use at terminal units for estimation of transmit paths, subcarrier assignment unit 130 for assigning the pilot signals supplied from the pilot signal generating unit 120 to the subcarriers, and signal processing units 140$a$, 140$b$ and 140$c$ for performing the antenna-by-antenna signal processing.

The user-by-user signal processor 110$x$ has an error-correction encoder 111 for performing error-correction coding on transmission data, and a modulator for applying the QPSK, 16 QAM and the like modulation to the error-correction coded data.

The outputs of signal processors 110$x$ and 110$y$ are assigned by subcarrier assignment unit 130 to appropriate subcarriers in response to subcarrier assignment information supplied from the transmit unit controller 20 (FIG. 28 referred to). The assigned subcarriers are then supplied to antenna-by-antenna signal processors 140$a$, 140$b$ and 140$c$. It should be noted here that subscriber assignment unit 130 also has the function of assigning the pilot signal from generator 120 to the common pilot channel (subcarrier) shown in FIG. 31.

The antenna-by-antenna signal processor 140$a$ receive the output of a subcarrier assignment unit 130 at a phase rotator unit 141 to apply the multiplication of a phase rotation of θm on a subcarrier-by-subcarrier basis to supply the phase-rotated output to an inverse fast Fourier transform (IFFT) unit 142. The signal processor 140$a$ further includes a serial-to-parallel conversion unit 143 for serial-parallel conversion of the output from IFFT unit 142, guard interval GI insertion unit 144 for inserting the guard interval to serial-parallel converter 143, filter unit 145 for selectively allowing only desired frequency band out of the output from GI adder unit to pass therethrough, and a D-A converter 146 for D-A converting the output of filter 145. With antenna-by-antenna signal processors 140$b$ and 140$c$ having the same makeup as signal processor 140$a$, the outputs from these signal processors 140$a$, 140$b$ and 140$c$ are frequency-converted at the rf signal frequency conversion unit 23 (FIG. 28) for rf transmission through antennas 24, 25 and 26 (FIG. 28), respectively.

It is noted here that phase rotation additionally achieved at the phase rotation unit 141 is assumed to be θm=2πfm·(n−1)T+Φ, where fm stands for the frequency spacing between the 0-th and m-th subcarriers, with fm=m/Ts, that Ts stands for the symbol length (length of time) for OFDM symbols, that (n−1)T stands for the length of the circulating delay time at the n-th antenna relative to the 1-st antenna. The circulating delay time is used as a delay in the present invention, with Φ standing for the initial phase. Since a specific subcarrier is used in a certain chunk, i.e., in either of the frequency diversity region or in the multiuser diversity region, transmit unit controller 20 (FIG. 28) for controlling transmit unit 21 indicates the use in either of the frequency diversity region or multiuser diversity region through frequency diversity/, multiuser diversity indication signal, based on which the above-mentioned delay T is changed. It is noted that the initial phase applied on a slot-by-slot basis or on a more than one slot-by-more than one slot basis or on a chunk-by-chunk basis can also be controlled by the initial phase control signal supplied from transmit unit controller 20 for controlling transmit unit 21, based on which the initial phase Φ is switched on a slot-by-slot basis, or on a more than one slot-by-more than one slot basis or on a chunk-by-chunk basis.

While it is assumed in FIG. 31 that the number of the users and the antennas are two and three, respectively, these numbers are not limited thereto.

If the rf signals are specifically scrambled signals involving scramble codes applied on an antenna-by-antenna, sector-by-sector, or base station-by basis station basis and, if such rf signals are transmitted an-antenna-by-antenna basis, the signal at a certain antenna may not look to be only a delayed version of a signal from other antennas, such delay is also of the same category employed in the present embodiment.

Fifth Embodiment

Figure 32:
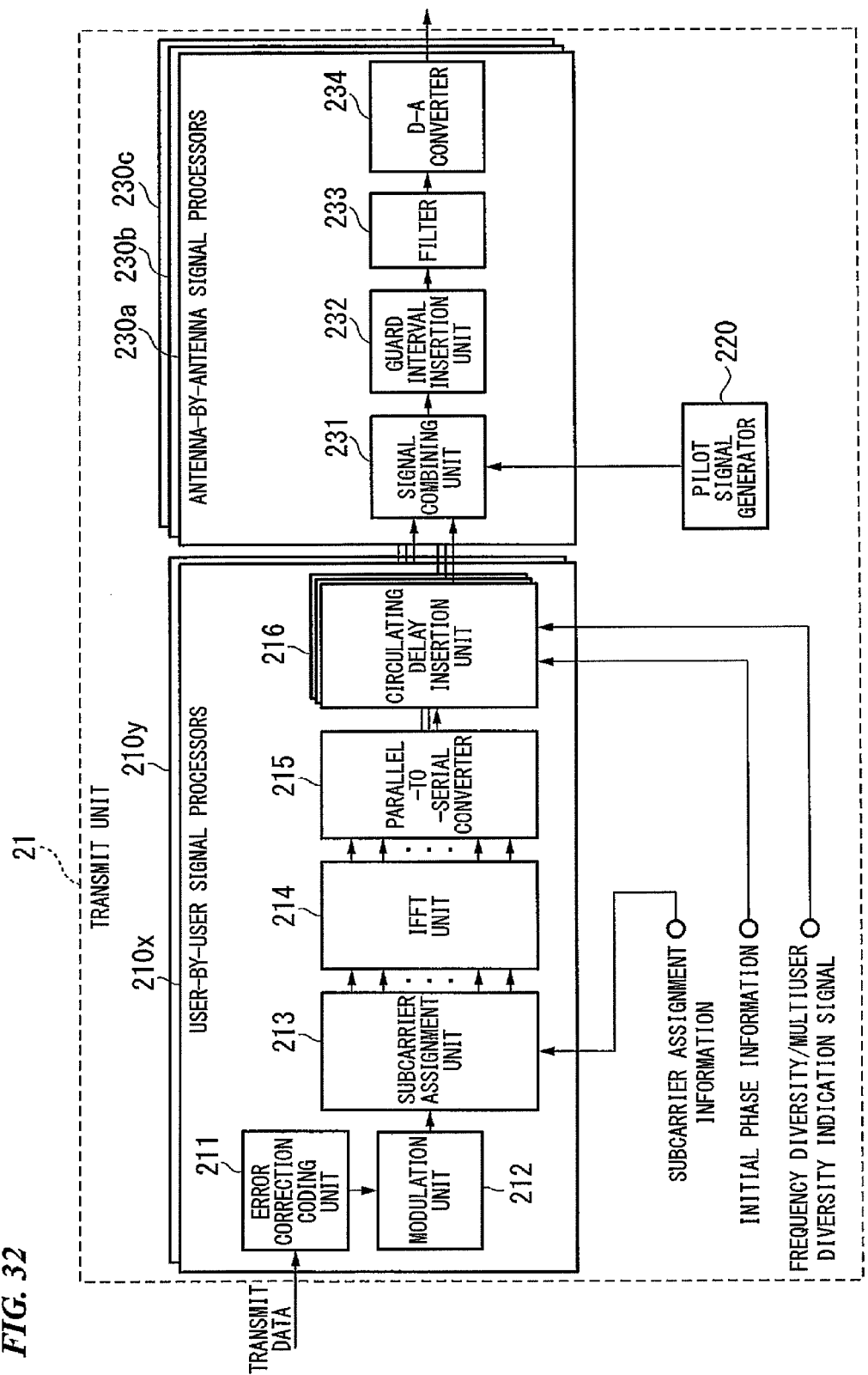
FIG. 32 shows in blocks the makeup of a transmit section 21 employed in the fifth embodiment.
Figure 33:
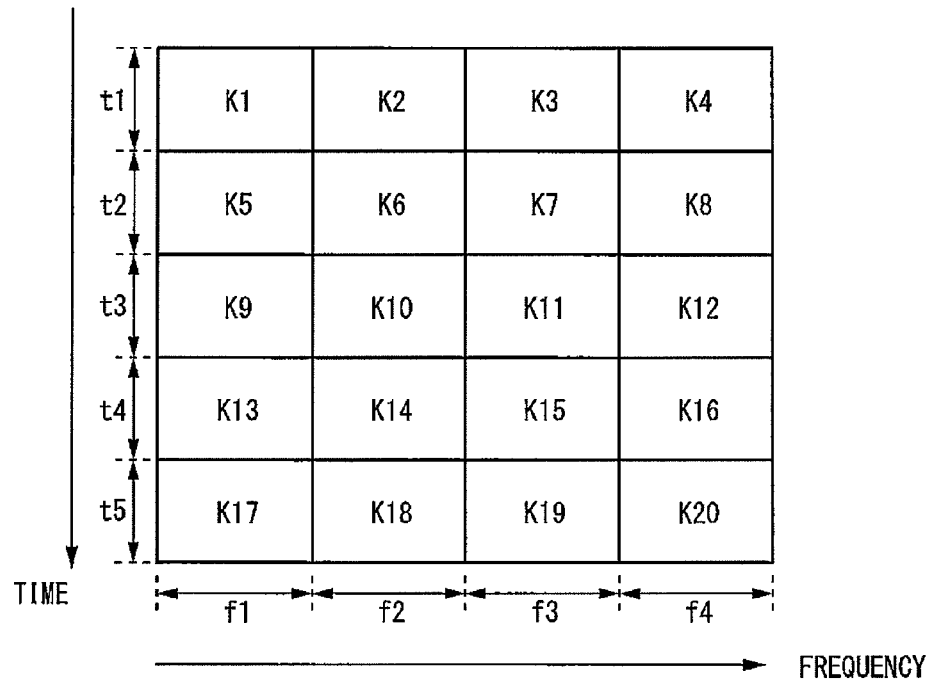
FIG. 33 shows an example of the time-frequency relationship for an rf signal transmitted from an rf transmitter to an rf receiver according to a conventional technique.
Figure 34:
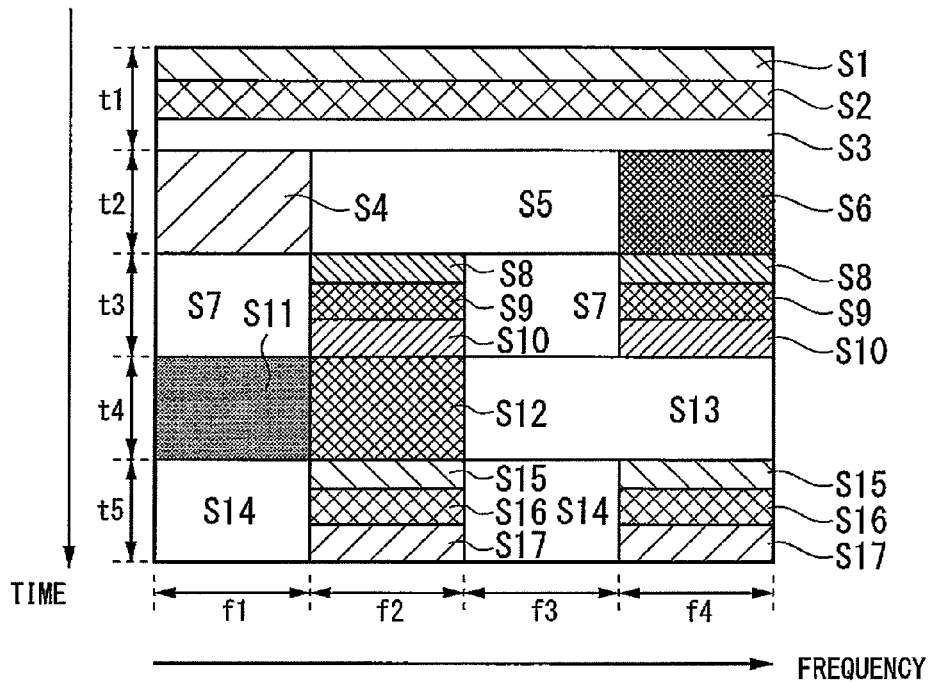
FIG. 34 shows another example of the time-frequency relationship for an rf signal transmitted from an rf transmitter to an rf receiver according to a conventional technique.

This embodiment has a makeup similar to the fourth embodiment except for the transmit unit 21. FIG. 32 shows in blocs the makeup of transmit unit 21 employed in this embodiment. The transmit unit 21 includes user-by-user signal processors 210$x$ and 210$y$; a pilot signal generator 220; and antenna-by-antenna signal processors 230$a$, 230$b$ and 230$c$ for performing signal processing associated with each of the signal processors.

User-by-user signal processor 210$x$ has error-correction encoder 211 for performing error-correction coding of codes to be transmitted, modulator 212 for applying QPSK, 16QAM and the like modulation to the error-correction coded data, subcarrier assignment unit 213 for assigning the output of modulator 212 to an appropriate subcarrier on the basis of the subcarrier assignment information supplied through an upper layer, an inverse fast Fourier transform (IFFT) unit 214 for performing the frequency domain-to-time domain conversion of the output from a subcarrier assignment unit 213, parallel-to-serial converter unit 215 for performing the parallel-to-serial conversion on the IFFT output, and a circulating delay insertion unit 216 for inserting antenna-by-antenna delay time to the output from the parallel-to-serial converter unit 215. The output from the circulating delay insertion unit 216 is supplied to antenna-by-antenna signal processors 230$a$, 230$b$ and 230$c$. It is to be noted here that the delay insertion unit 216 gives a mutually different delay and initial phase on an antenna-by-antenna basis, in response to the frequency diversity/multiuser diversity indication information supplied from transmit unit controller 20 for controlling transmit unit 21. For detail reference is made to the first to fourth embodiments described above.

The antenna-by-antenna signal processor 230$a$ includes a signal combining unit 231 for combining signals supplied from user-by-user signal processors 210$x$ and 210$y$ and for multiplexing the combined signal with the pilot symbols supplied from a pilot signal generator 220, a guard interval (GI) insertion unit 232 for inserting GI to the output from combining unit 231, filter unit 233 for selectively allowing the desired frequency band out of the output from the GI insertion unit 232 to pass therethrough, and a D-A converter for D-A converting the output from the filter 233. With antenna-by-antenna signal processors 230$b$ and 230$c$ having a makeup similar to the signal processor 230$a$ described above, the outputs from the signal processors 230$a$, 230$b$ and 230$c$ are frequency-converted at a frequency converter (not shown) into rf signal for transmission through antennas 24, 25 and 26.

While the description has been made above assuming the number of users and antenna to be two and three, respectively, these numbers may be greater than those described.

When scrambling is applied on an antenna-by-antenna, sector-by-sector, or base station-by-base station basis by a specific scrambling code, a signal at one of the antennas may not look to be the simply delayed one, such mode of operation being included in this embodiment.

It is noted here that while the initial phase and the delay are given to the phase rotating unit 141 in the fourth embodiment and to the circulating delay insertion unit 216 in the fifth embodiment, the initial phase may be given to the phase rotating unit, with delay given at the circulating delay insertion unit. Similarly, the initial phase may be given the circulation delay insertion unit, with delay given to the phase circulation unit.

While preferred embodiments of the invention have been described and illustrated above, it should be understood that these are exemplary of the invention and are not to be considered as limiting. Additions, omissions, substitutions and other modifications can be made without departing from the spirit or scope of the invention. Accordingly, the invention is to be considered as not being limited by the foregoing description, and is only limited by the scope of the appended claims.

INDUSTRIAL APPLICABILITY

The transmitter according to the present invention can be used in a base station for a mobile communication system, such as, for mobile phones.

The invention claimed is:

1. A transmission control method comprising:
providing data to be transmitted through a plurality of antennas using regions defined by frequency and time axes;
providing the data to be transmitted with a delay that is constant along a portion of the frequency axis, wherein every delay for each antenna is provided based on utilizing the cyclic delay diversity;
providing an initial phase to the data by applying a first initial phase process, a second initial phase process, or the first initial phase process and the second initial phase process, wherein
said first initial phase process includes:
providing the data to be transmitted with an initial phase that is variable along the portion of the frequency axis from one of a plurality of initial phases for each of the regions such that the initial phase of each of the regions is different from the initial phase of at least another of the regions, and
said second initial phase process includes:
providing a first initial phase to the data to be transmitted by at least one antenna of the plurality of antennas, and
providing a second initial phase to the data to be transmitted by an antenna of the plurality of antennas,
wherein the first initial phase is a phase different from the second initial phase, and
wherein said delay and said initial phase are provided together.

2. The transmission control method according to claim 1, wherein said second initial phase is provided to the data to be transmitted by said antenna of the plurality of antennas such that said antenna provided with said second initial phase is a different antenna than said at least one antenna that transmits the data provided with the first initial phase.

3. The transmission control method according to claim 1, wherein a first initial phase is provided to the data to be transmitted by at least two antennas of the plurality of antennas.

4. A transmitter comprising:
a plurality of antennas; and
a transmitting section which is configured to:
provide data to be transmitted through a plurality of antennas using regions defined by frequency and time axes;
provide the data to be transmitted with a delay that is constant along a portion of the frequency axis, wherein every delay for each antenna is provided based on utilizing the cyclic delay diversity;
provide an initial phase to the data by applying a first initial phase process, a second initial phase process, or the first initial phase process and the second initial phase process, wherein
said first initial phase process includes:
providing the data to be transmitted with an initial phase that is variable along the portion of the frequency axis from one of a plurality of initial phases for each of the regions such that the initial phase of each of the regions is different from the initial phase of at least another of the regions, and
said second initial phase process includes:
providing a first initial phase to the data to be transmitted by at least one antenna of the plurality of antennas, and
providing a second initial phase to the data to be transmitted by an antenna of the plurality of antennas,
wherein the first initial phase is a phase different from the second initial phase, and
wherein said delay and said initial phase are provided together.

5. The transmitter according to claim 4, wherein said second initial phase is provided to the data to be transmitted by said antenna of the plurality of antennas such that said antenna provided with said second initial phase is a different antenna than said at least one antenna that transmits the data provided with the first initial phase.

6. The transmitter according to claim 4, wherein a first initial phase is provided to the data to be transmitted by at least two antennas of the plurality of antennas.

7. A transmitter comprising:
a plurality of antennas; and
a transmitting section which is configured to:
provide data to be transmitted through a plurality of antennas using regions defined by frequency and time axes;
provide the data to be transmitted with a delay that is constant along a portion of the frequency axis, wherein every delay for each antenna is provided based on utilizing the cyclic delay diversity;
provide an initial phase to the data by applying a first initial phase process, a second initial phase process, or the first initial phase process and the second initial phase process, wherein
said first initial phase process includes:
providing the data to be transmitted with an initial phase that is variable along the portion of the frequency axis from one of a plurality of initial phases for each of the regions such that the initial phase of each of the regions is different from the initial phase of at least another of the regions, and said second initial phase process includes:

provided a first initial phase to the data to be transmitted by at least two antennas of the plurality of antennas, and providing a second initial phase to the data to be transmitted by an antenna of the plurality of antennas, wherein the first initial phase is a phase different from the second initial phase, and wherein said delay and said initial phase are provided together.

8. The transmitter according to claim 7, wherein said second initial phase is provided to the data to be transmitted by said antenna of the plurality of antennas such that said antenna provided with said second initial phase is a different antenna than said at least two antennas that transmit the data provided with the first initial phase.

9. The transmitter according to claim 7, wherein a first initial phase is provided to the data to be transmitted by at least two antennas of the plurality of antennas.

* * * * *